(12) United States Patent
Sato

(10) Patent No.: US 7,408,746 B2
(45) Date of Patent: Aug. 5, 2008

(54) MAGNETORESISTIVE DEVICE AND METHOD OF MANUFACTURING SAME, THIN-FILM MAGNETIC HEAD, HEAD GIMBAL ASSEMBLY, HEAD ARM ASSEMBLY AND MAGNETIC DISK DRIVE

(75) Inventor: Junichi Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 408 days.

(21) Appl. No.: 11/167,757

(22) Filed: Jun. 28, 2005

(65) Prior Publication Data
US 2006/0018056 A1 Jan. 26, 2006

(30) Foreign Application Priority Data
Jul. 26, 2004 (JP) ............................. 2004-217571

(51) Int. Cl.
*G11B 5/39* (2006.01)
*G11B 5/31* (2006.01)
(52) U.S. Cl. .................... 360/322; 360/319; 360/324.2; 360/324.12
(58) Field of Classification Search ................. 360/319, 360/324.12, 324.2, 322
See application file for complete search history.

(56) References Cited

U.S. PATENT DOCUMENTS

| | | | |
|---|---|---|---|
| 6,669,983 B2 | 12/2003 | Kagami et al. | |
| 6,680,829 B2 * | 1/2004 | Chen et al. | 360/319 |
| 6,680,832 B2 * | 1/2004 | Fontana et al. | 360/324.2 |
| 6,980,403 B2 * | 12/2005 | Hasegawa | 360/319 |
| 7,158,351 B2 * | 1/2007 | Nakamoto et al. | 360/319 |
| 7,280,325 B1 * | 10/2007 | Pan | 360/324.12 |
| 2002/0034055 A1 | 3/2002 | Seyama et al. | |
| 2002/0067580 A1 * | 6/2002 | Li et al. | 360/321 |
| 2003/0174446 A1 * | 9/2003 | Hasegawa | 360/319 |
| 2004/0100737 A1 * | 5/2004 | Nakamoto et al. | 360/319 |
| 2004/0223265 A1 * | 11/2004 | Ohtomo et al. | 360/317 |
| 2006/0092582 A1 * | 5/2006 | Gill et al. | 360/324.12 |
| 2007/0028442 A1 * | 2/2007 | Takano | 29/603.07 |
| 2007/0186408 A1 * | 8/2007 | Nix et al. | 29/603.01 |

FOREIGN PATENT DOCUMENTS

| | | |
|---|---|---|
| JP | A 2002-123916 | 4/2002 |
| JP | A 2003-132509 | 5/2003 |
| JP | A 2003-203313 | 7/2003 |

* cited by examiner

*Primary Examiner*—William J Klimowicz
(74) *Attorney, Agent, or Firm*—Oliff & Berridge, PLC

(57) ABSTRACT

A magnetoresistive device comprises: a first shield layer and a second shield layer disposed with a space from each other in the direction of thickness; an MR element disposed between the first and second shield layers; and a layered structure disposed between the first and second shield layers on both sides of the MR element. The layered structure includes an insulating layer and bias field applying layers. The second shield layer has a surface facing toward the first shield layer. This surface includes a first portion touching the top surface of the MR element and second portions located on both sides of the MR element, the sides being opposed to each other in the direction of track width. A difference in level is created between the first and second portions such that the second portions are closer to the first shield layer than the first portion.

8 Claims, 16 Drawing Sheets

MAGNETORESISTIVE DEVICE AND METHOD OF MANUFACTURING SAME, THIN-FILM MAGNETIC HEAD, HEAD GIMBAL ASSEMBLY, HEAD ARM ASSEMBLY AND MAGNETIC DISK DRIVE

BACKGROUND OF THE INVENTION

1. Field of the Invention

The present invention relates to a magnetoresistive device and a method of manufacturing the same and to a thin-film magnetic head, a head gimbal assembly, a head arm assembly and a magnetic disk drive each of which incorporates the magnetoresistive device.

2. Description of the Related Art

Performance improvements in thin-film magnetic heads have been sought as areal recording density of magnetic disk drives has increased. A widely used type of thin-film magnetic head is a composite thin-film magnetic head that has a structure in which a write (recording) head having an induction-type electromagnetic transducer for writing and a read (reproducing) head having a magnetoresistive (MR) element for reading are stacked on a substrate.

MR elements include: anisotropic magnetoresistive (AMR) elements utilizing an anisotropic magnetoresistive effect; giant magnetoresistive (GMR) elements utilizing a giant magnetoresistive effect; and tunnel magnetoresistive (TMR) elements utilizing a tunnel magnetoresistive effect.

It is required that the characteristics of a read head include high sensitivity and high output capability. GMR heads incorporating spin-valve GMR elements have been mass-produced as read heads that satisfy such requirements. Recently, developments in read heads using TMR elements have been sought to conform to further improvements in areal recording density.

Conventional GMR heads have a structure in which a current used for detecting magnetic signals (that is hereinafter called a sense current) is fed in the direction parallel to a plane of each layer making up the GMR element. Such a structure is called a current-in-plane (CIP) structure. In the GMR head having the CIP structure, the GMR element is insulated from each of top and bottom shield layers by an insulating film. As a result, there arises a problem that, if the space between the top and bottom shield layers (that is hereinafter called a shield gap length) is reduced to enhance the linear recording density of the GMR head having the CIP structure, the above-mentioned insulating film is made thin and it is therefore difficult to maintain the insulation between the GMR element and each of the shield layers.

To solve such a problem, there have been proposed GMR heads having a structure in which a sense current is fed in the direction perpendicular to a plane of each layer making up the GMR element. Such a structure is called a current-perpendicular-to-plane (CPP) structure. It is not necessary to insulate the GMR element from each of the shield layers for the GMR head having the CPP structure. Therefore, the GMR head having the CPP structure is free from the above-mentioned problem. In addition, the GMR head having the CPP structure has an advantage that, when the track width is reduced, it is capable of producing a greater output than the output of the GMR head having the CIP structure. A TMR head incorporating a TMR element has the CPP structure, too.

In the heads having the CPP structure, a pair of electrode layers for feeding a sense current to the MR element are disposed with a space between the electrode layers in the direction of thickness. The MR element is disposed between the pair of electrode layers. The electrode layers may function as shield layers, too. In this case, the space between the electrode layers is the shield gap length. Typically, bias field applying layers for applying a bias magnetic field to the MR element are disposed on both sides of the MR element, the sides being opposed to each other in the direction of track width. The bias magnetic field directs the direction of magnetization in a layer of the MR element to a specific direction when no signal magnetic field is applied to the MR element, wherein the direction of magnetization in the layer changes in response to a signal magnetic field.

There are some prior-art methods of manufacturing the heads having the CPP structure as will now be described.

A first method is the one disclosed as lift-off in the Published Unexamined Japanese Patent Application 2003-203313 and the Published Unexamined Japanese Patent Application 2003-132509. In this method, an MR film to be an MR element is first formed on a lower electrode layer. Next, a mask is formed on the MR film, and the MR film is selectively etched through the use of the mask to form the MR element. Next, while the mask is left unremoved, an insulating layer is formed to cover the MR element, the mask and the lower electrode layer. The mask is then removed. The top surface of the MR element is thereby exposed. Next, an upper electrode layer is formed on the MR element and the insulating layer.

A second method is the one disclosed as a contact hole method in the Published Unexamined Japanese Patent Application 2003-203313 and the Published Unexamined Japanese Patent Application 2003-132509. This method will now be described with reference to FIG. 27. In the method, an MR film is first formed on a lower electrode layer 101. Next, a mask is formed on the MR film, and the MR film is selectively etched through the use of the mask to form an MR element 102. Next, the mask is removed, and then an insulating layer 103 is formed on the MR element 102 and the lower electrode layer 101. Next, a portion of the insulating layer 103 located on the MR element 102 is selectively etched to form a contact hole 103a. The top surface of the MR element 102 is thereby exposed. Next, an upper electrode layer 104 is formed on the MR element 102 and the insulating layer 103.

A third method is disclosed in the Published Unexamined Japanese Patent Application 2003-203313. This method will now be described with reference to FIG. 28. In the method, an MR film is first formed on the lower electrode layer 101. Next, a mask is formed on the MR film, and the MR film is selectively etched through the use of the mask to form the MR element 102. Next, the mask is removed, and then an insulating layer 105 is formed on the MR element 102 and the lower electrode layer 101. Next, ion beam etching or chemical mechanical polishing (hereinafter referred to as CMP) is performed to remove a portion of the insulating layer 105 located higher than the level of the top surface of the MR element 102 indicated by an alternate long and two short dashes line with numeral 106 in FIG. 28. The top surface of the MR element 102 is thereby exposed and the top surfaces of the MR element 102 and the insulating layer 105 are thereby flattened. Next, an upper electrode layer is formed on the MR element 102 and the insulating layer 105.

A fourth method is disclosed in the Published Unexamined Japanese Patent Application 2003-132509. In this method, an MR film is first formed on a lower electrode layer. Next, a mask is formed on the MR film, and the MR film is selectively etched through the use of the mask to form the MR element. Next, while the mask is left unremoved, an insulating layer is formed to cover the MR element, the mask and the lower electrode layer. Next, the insulating layer is polished until the mask is exposed or immediately before the mask is exposed.

If the mask is made of an insulating material, the mask is then removed. If the mask is made of a conductive material, the mask may be removed or left unremoved to be used as a protection layer. Next, an upper electrode layer is formed on the insulating layer and the MR element or the mask.

A fifth method is disclosed in the Published Unexamined Japanese Patent Application 2002-123916. This method will now be described with reference to FIG. 29. In the method, first, an MR film and a conductive protection film are formed one by one on the lower electrode layer 101. Next, a mask is formed on the protection film, and the protection film and the MR film are selectively etched through the use of the mask to form the MR element 102. A protection layer 107 made up of the protection film patterned is disposed on the MR element 102. Next, the mask is removed, and then an insulating layer 108 is formed to cover the MR element 102, the protection layer 107 and the lower electrode layer 101. Next, the insulating layer 108 is polished by CMP until the protection layer 107 is exposed. Next, the upper electrode layer 104 is formed on the protection layer 107 and the insulating layer 108.

Each of the above-described first to fifth methods has problems described below. In the first method, as described in the Published Unexamined Japanese Patent Application 2003-203313 and the Published Unexamined Japanese Patent Application 2003-132509, on the top surface of the MR element, burrs made of unwanted accumulations are formed around the region in which the mask was located and/or the insulating layer overlaps the top surface of the MR element. In either of these cases, it is difficult to form the upper electrode layer having a desired shape with precision.

In the second method, as shown in FIG. 27, a portion of the insulating layer 103 around the contact hole 103a protrudes upward above the top surface of the MR element 102. In this case, too, it is difficult to form the upper electrode layer 104 having a desired shape with precision.

The third method has a problem that it is difficult to precisely remove only the portion of the insulating layer 105 located higher than the level of the top surface of the MR element 102. If the insulating layer 105 remains on the top surface of the MR element 102, it is impossible to electrically connect the MR element 102 to the upper electrode layer 104. On the other hand, if a portion of the MR element 102 is cut away, the property of the MR element 102 is changed.

In the fourth method, when the mask on the MR element is removed, a portion of the insulating layer around the MR element protrudes upward above the top surface of the MR element. In this case, it is difficult to form the upper electrode layer having a desired shape with precision. The fourth method has another problem that, if the mask on the MR element is left unremoved, it is difficult to keep the thickness of the remaining mask unchanged, and it is therefore difficult to keep the shield gap length unchanged.

The fifth method has a problem that it is difficult to maintain the thickness of the protection layer 107 remaining after the insulating layer 108 is polished, and it is therefore difficult to keep the shield gap length unchanged.

In any of the second to fifth methods, the insulating layer is disposed around the MR element, and the top surface of the insulating layer and the top surface of the MR element or the protection layer are located at nearly the same level. As a result, in any of the second to fifth methods, the thick insulating layer is once formed on the MR element or the protection layer, too, in the course of manufacturing process of the head, and the insulating layer is removed by etching or CMP. This causes the above-described problems.

OBJECT AND SUMMARY OF THE INVENTION

It is an object of the invention to provide a magnetoresistive device that has a structure in which a magnetoresistive element is disposed between a pair of electrode layers disposed with a space from each other in the direction of thickness and that is capable of being formed with precision, and a method of manufacturing such a magnetoresistive device, and to provide a thin-film magnetic head, a head gimbal assembly, a head arm assembly and a magnetic disk drive each of which incorporates the magnetoresistive device.

A magnetoresistive device of the invention comprises: a first electrode layer and a second electrode layer disposed with a space from each other in a direction of thickness; and a magnetoresistive element disposed between the first and second electrode layers. The magnetoresistive element has a first surface touching the first electrode layer and a second surface touching the second electrode layer. The magnetoresistive element and the second electrode layer are stacked on the first electrode layer. The second electrode layer has a surface facing toward the first electrode layer, the surface including a first portion touching the second surface of the magnetoresistive element and second portions disposed on both sides of the magnetoresistive element. A difference in level is created between the first portion and the second portions such that the second portions are closer to the first electrode layer than the first portion. Therefore, according to the invention, it is impossible that an insulating layer is disposed around the magnetoresistive element such that the top surface of the insulating layer is located at a height nearly the same as the height at which the second surface of the magnetoresistive element is located.

The magnetoresistive device of the invention may further comprise a layered structure disposed between the first and second electrode layers on both sides of the magnetoresistive element, the layered structure including an insulating layer and bias field applying layers for applying a bias magnetic field to the magnetoresistive element.

In the magnetoresistive device of the invention, the insulating layer may be disposed between the first electrode layer and the bias field applying layers in a region between the first electrode layer and the second portions. In this case, the layered structure may include adjacent portions that are adjacent to side surfaces of the magnetoresistive element, and, in the adjacent portions, the insulating layer may be disposed between the respective bias field applying layers and the respective side surfaces of the magnetoresistive element.

In the magnetoresistive device of the invention, the insulating layer may be disposed between the second electrode layer and the bias field applying layers in a region between the first electrode layer and the second portions. In this case, the layered structure may include adjacent portions that are adjacent to side surfaces of the magnetoresistive element, and, in the adjacent portions, the bias field applying layers may be disposed between the insulating layer and the respective side surfaces of the magnetoresistive element.

In the magnetoresistive device of the invention, the layered structure may include a first insulating layer and a second insulating layer that serve as the insulating layer, and the bias field applying layers may be disposed between the first and second insulating layers. In this case, in a region between the first electrode layer and the second portions, the first insulating layer may be disposed between the first electrode layer and the bias field applying layers, and the second insulating layer may be disposed between the second electrode layer and the bias field applying layers. The layered structure may include adjacent portions that are adjacent to the side surfaces of the magnetoresistive element. In this case, in the adjacent portions, the first insulating layer may be disposed between the respective bias field applying layers and the respective side surfaces of the magnetoresistive element, while the second insulating layer may be disposed between the respective bias field applying layers and the second electrode layer.

A magnetoresistive device manufactured through a method of the invention comprises: a first electrode layer and a second electrode layer disposed with a space from each other in a direction of thickness; a magnetoresistive element disposed between the first and second electrode layers; and a layered structure disposed between the first and second electrode layers on both sides of the magnetoresistive element. The magnetoresistive element has a first surface touching the first electrode layer and a second surface touching the second electrode layer. The layered structure includes an insulating layer and bias field applying layers for applying a bias magnetic field to the magnetoresistive element. The magnetoresistive element, the layered structure and the second electrode layer are stacked on the first electrode layer. The second electrode layer has a surface facing toward the first electrode layer, the surface including a first portion touching the second surface of the magnetoresistive element and second portions disposed on both sides of the magnetoresistive element. A difference in level is created between the first portion and the second portions such that the second portions are closer to the first electrode layer than the first portion.

The method of manufacturing the magnetoresistive device of the invention comprises the steps of: forming the first electrode layer; forming the magnetoresistive element on the first electrode layer; forming a layered film so as to cover the first electrode layer and the magnetoresistive element, the layered film including a film to be the bias field applying layers and an insulating film to be the insulating layer; forming the layered structure by removing a portion of the layered film located on the magnetoresistive element and thereby forming the remaining portion of the layered film into the layered structure; and forming the second electrode layer on the magnetoresistive element and the layered structure.

According to the invention, the layered film is made to have a thickness smaller than a difference in level between the second surface of the magnetoresistive element and the top surface of a portion of the first electrode layer around the magnetoresistive element.

In the step of forming the layered structure in the method of the invention, in the portion of the layered film located on the magnetoresistive element, the film to be the bias field applying layers may be removed by dry etching and the insulating film may be removed by wet etching or dry etching.

In the method of the invention, in the step of forming the layered film, the film to be the bias field applying layers may be formed after the insulating film is formed. In this case, the layered structure may include adjacent portions that are adjacent to side surfaces of the magnetoresistive element, and, in the adjacent portions, the insulating layer may be disposed between the respective bias field applying layers and the respective side surfaces of the magnetoresistive element.

In the method of the invention, in the step of forming the layered film, the insulating film may be formed after the film to be the bias field applying layers is formed. In this case, the layered structure may include adjacent portions that are adjacent to the side surfaces of the magnetoresistive element, and, in the adjacent portions, the bias field applying layers may be disposed between the insulating layer and the respective side surfaces of the magnetoresistive element.

According to the method of the invention, the layered structure may include a first insulating layer and a second insulating layer that serve as the insulating layer, and the bias field applying layers may be disposed between the first and second insulating layers. The layered film may include a first insulating film to be the first insulating layer and a second insulating film to be the second insulating layer, the first and second insulating films serving as the insulating film. In addition, the first insulating film, the film to be the bias field applying layers and the second insulating film may be formed in this order in the step of forming the layered film. In this case, the layered structure may include adjacent portions that are adjacent to side surfaces of the magnetoresistive element. In the adjacent portions, the first insulating layer may be disposed between the respective bias field applying layers and the respective side surfaces of the magnetoresistive element, while the second insulating layer may be disposed between the respective bias field applying layers and the second electrode layer.

A thin-film magnetic head of the invention comprises: a medium facing surface that faces toward a recording medium; and the magnetoresistive device of the invention disposed near the medium facing surface to detect a signal magnetic field sent from the recording medium.

A head gimbal assembly of the invention comprises: a slider including the thin-film magnetic head of the invention and disposed to face toward a recording medium; and a suspension flexibly supporting the slider.

A head arm assembly of the invention comprises: a slider including the thin-film magnetic head of the invention and disposed to face toward a recording medium; a suspension flexibly supporting the slider; and an arm for making the slider travel across tracks of the recording medium, wherein the suspension is attached to the arm.

A magnetic disk drive of the invention comprises: a slider including the thin-film magnetic head of the invention and disposed to face toward a circular-plate-shaped recording medium that is rotated and driven; and an alignment device supporting the slider and aligning the slider with respect to the recording medium.

According to the magnetoresistive device or the method of manufacturing the same, the thin-film magnetic head, the head gimbal assembly, the head arm assembly, or the magnetic disk drive of the invention, it is impossible that an insulating layer is disposed around the magnetoresistive element such that the top surface of the insulating layer is located at a height nearly the same as the height at which the second surface of the magnetoresistive element is located. Consequently, according to the invention, it is also impossible that a thick insulating layer is formed on the second surface of the magnetoresistive element in the course of manufacturing process of the magnetoresistive device. It is therefore possible to form the magnetoresistive device with precision.

Other and further objects, features and advantages of the invention will appear more fully from the following description.

DETAILED DESCRIPTION OF THE PREFERRED EMBODIMENTS

Preferred embodiments of the invention will now be described in detail with reference to the accompanying drawings.

First Embodiment

Figure 5:
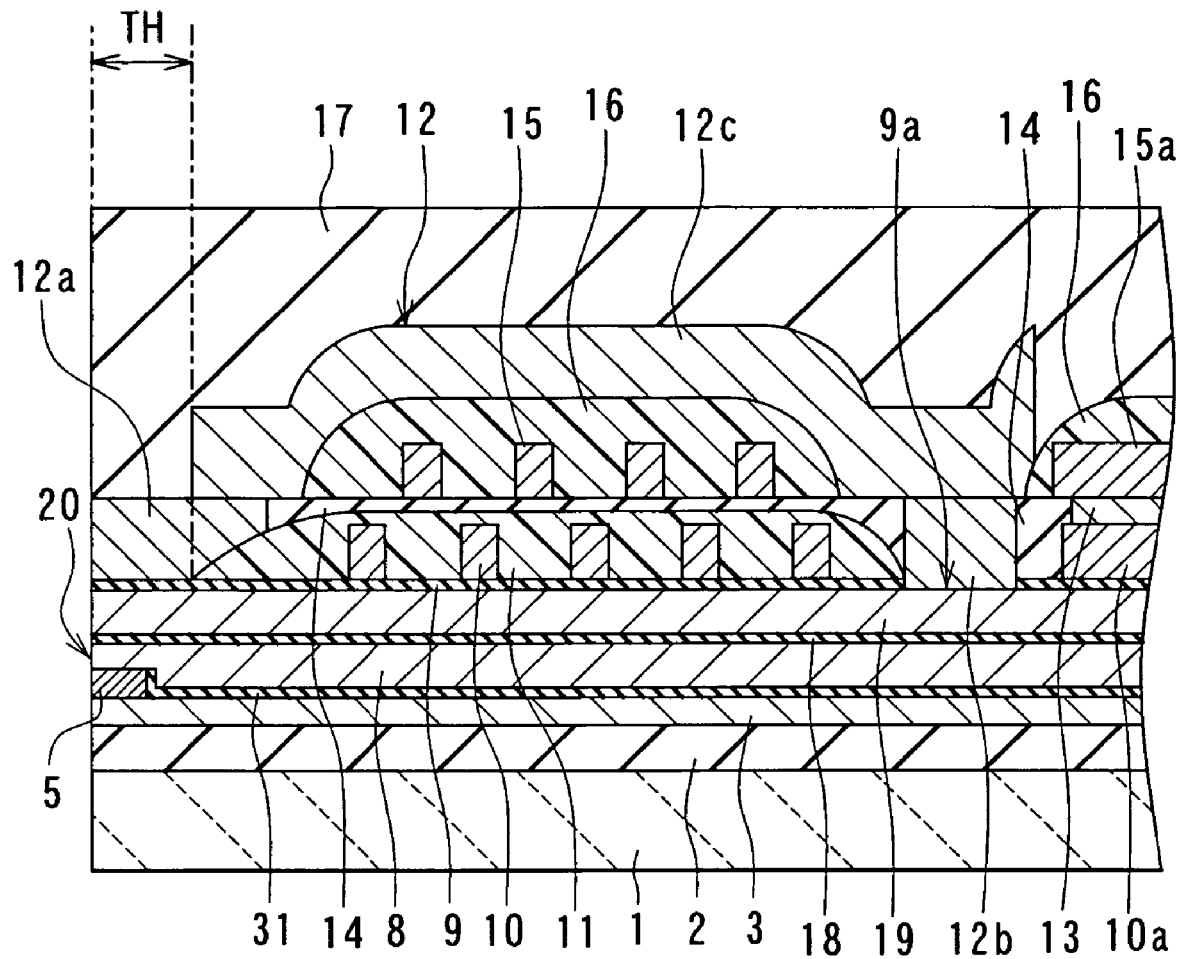
FIG. 5 is a cross-sectional view of a thin-film magnetic head of the first embodiment of the invention, wherein the cross section is orthogonal to the air bearing surface and the substrate.
Figure 6:
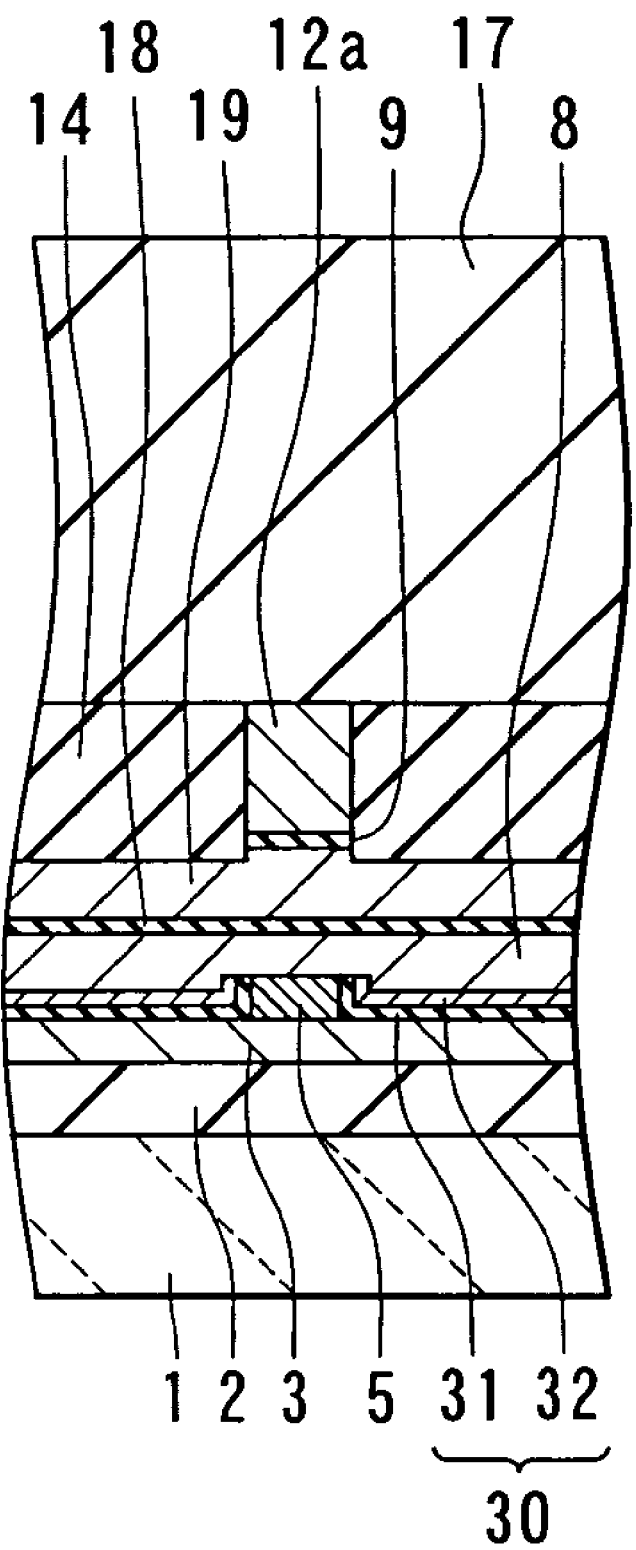
FIG. 6 is a cross-sectional view of a pole portion of the thin-film magnetic head of the first embodiment of the invention, wherein the cross section is parallel to the air bearing surface.

Reference is now made to FIG. 5 and FIG. 6 to describe the outlines of the configuration and a manufacturing method of a thin-film magnetic head of a first embodiment of the invention. FIG. 5 illustrates a cross section of the thin-film magnetic head orthogonal to the air bearing surface and a substrate. FIG. 6 illustrates a cross section of a pole portion of the thin-film magnetic head parallel to the air bearing surface.

In the method of manufacturing the thin-film magnetic head of the embodiment, first, an insulating layer 2 made of an insulating material such as alumina ($Al_2O_3$) and having a thickness of 1 to 5 μm, for example, is formed by a method such as sputtering on a substrate 1 made of a ceramic such as aluminum oxide and titanium carbide ($Al_2O_3$—TiC). Next, a first shield layer 3 for a read head having a specific pattern and made of a magnetic material such as NiFe or FeAlSi is formed on the insulating layer 2 by a method such as plating. Next, although not shown, an insulating layer of alumina, for example, is formed over the entire surface. Next, the insulating layer is polished by CMP, for example, so that the first shield layer 3 is exposed, and the top surfaces of the first shield layer 3 and the insulating layer are thereby flattened.

Next, an MR element 5 for reading is formed on the first shield layer 3. Next, an insulating layer 31 disposed around the MR element 5 and two bias field applying layers 32 are formed. The bias field applying layers 32 are adjacent to the two sides of the MR element 5 with the insulating layer 31 disposed between the MR element 5 and each of the layers 32. The insulating layer 31 is made of an insulating material such as alumina. The bias field applying layers 32 are each made of a hard magnetic layer (a hard magnet) or a layered structure made up of a ferromagnetic layer and an antiferromagnetic layer, for example.

Next, a second shield layer 8 for the read head is formed on the MR element 5, the insulating layer 31 and the bias field applying layers 32. The second shield layer 8 is made of a magnetic material and may be formed by plating or sputtering, for example. Next, a separating layer 18 made of a nonmagnetic material such as alumina is formed by sputtering, for example, on the second shield layer 8. Next, a bottom pole layer 19 provided for a write head and made of a magnetic material is formed on the separating layer 18 by plating or sputtering, for example. The magnetic material used for the second shield layer 8 and the bottom pole layer 19 is a soft magnetic material such as NiFe, CoFe, CoFeNi or FeN. Alternatively, a second shield layer that also functions as a bottom pole layer may be provided in place of the separating layer 18 and the bottom pole layer 19.

Next, a write gap layer 9 made of a nonmagnetic material such as alumina and having a thickness of 50 to 300 nm, for example, is formed on the bottom pole layer 19 by a method such as sputtering. Next, to make a magnetic path, a portion of the write gap layer 9 is etched to form a contact hole 9a in a center portion of a thin-film coil described later.

Next, a first layer portion 10 of the thin-film coil made of copper (Cu), for example, and having a thickness of 2 to 3 μm, for example, is formed on the write gap layer 9. In FIG. 5, numeral 10a indicates a connecting portion of the first layer portion 10 connected to a second layer portion 15 of the thin-film coil described later. The first layer portion 10 is wound around the contact hole 9a.

Next, an insulating layer 11 having a specific pattern is formed to cover the first layer portion 10 of the thin-film coil and the write gap layer 9 disposed around the first layer portion 10. The insulating layer 11 is made of an organic insulating material that exhibits fluidity when heated, such as photoresist. Next, heat treatment is performed at a specific temperature to flatten the surface of the insulating layer 11. Through this heat treatment, each of the outer and inner edge portions of the insulating layer 11 is made to have a shape of rounded sloped surface.

Next, a track width defining layer 12a of a top pole layer 12 made of a magnetic material for the write head is formed on regions of the write gap layer 9 and the insulating layer 11, the regions extending from a sloped portion of the insulating layer 11 closer to an air bearing surface 20 described later toward the air bearing surface 20. The top pole layer 12 is made up of the track width defining layer 12a, and a coupling portion layer 12b and a yoke portion layer 12c that will be described later.

The track width defining layer 12a has: a tip portion that is formed on the write gap layer 9 and functions as the pole portion of the top pole layer 12; and a connecting portion that is formed on the sloped portion of the insulating layer 11 closer to the air bearing surface 20 and is connected to the yoke portion layer 12c. The tip portion has a width equal to the write track width. The connecting portion has a width greater than that of the tip portion.

When the track width defining layer 12a is formed, the coupling portion layer 12b made of a magnetic material is formed in the contact hole 9a, and a connecting layer 13 made of a magnetic material is formed on the connecting portion 10a at the same time. The coupling portion layer 12b makes up a portion of the top pole layer 12 that is magnetically coupled to the bottom pole layer 19.

Next, pole trimming is performed. That is, in a region around the track width defining layer 12a, the write gap layer 9 and at least a portion of the pole portion of the bottom pole layer 19 close to the write gap layer 9 are etched, using the track width defining layer 12a as a mask. As a result, as shown in FIG. 6, a trim structure is formed, wherein the pole portion of the top pole layer 12, the write gap layer 9 and at least a portion of the pole portion of the bottom pole layer 19 have equal widths. The trim structure has an effect of preventing an increase in effective track width resulting from an expansion of magnetic flux near the write gap layer 9.

Next, an insulating layer 14 made of an inorganic insulating material such as alumina and having a thickness of 3 to 4 μm, for example, is formed over the entire surface. The insulating layer 14 is then polished by CMP, for example, to reach the surfaces of the track width defining layer 12a, the coupling portion layer 12b and the connecting layer 13, and flattened.

Next, the second layer portion 15 of the thin-film coil made of copper (Cu), for example, and having a thickness of 2 to 3 μm, for example, is formed on the flattened insulating layer 14. In FIG. 5, numeral 15a indicates a connecting portion of the second layer portion 15 connected to the connecting portion 10a of the first layer portion 10 of the thin-film coil through the connecting layer 13. The second layer portion 15 is wound around the coupling portion layer 12b.

Next, an insulating layer 16 having a specific pattern is formed to cover the second layer portion 15 of the thin-film coil and the insulating layer 14 disposed around the second layer portion 15. The insulating layer 16 is made of an organic insulating material that exhibits fluidity when heated, such as photoresist. Next, heat treatment is performed at a specific temperature to flatten the surface of the insulating layer 16. Through this heat treatment, each of the outer and inner edge portions of the insulating layer 16 is made to have a shape of rounded sloped surface.

Next, the yoke portion layer 12c made of a magnetic material for the write head such as Permalloy is formed on the track width defining layer 12a, the insulating layers 14 and 16, and the coupling portion layer 12b. The yoke portion layer 12c makes up the yoke portion of the top pole layer 12. An end of the yoke portion layer 12c closer to the air bearing surface 20 is located at a distance from the air bearing surface 20. The yoke portion layer 12c is connected to the bottom pole layer 19 through the coupling portion layer 12b.

Next, an overcoat layer 17 made of alumina, for example, is formed to cover the entire surface. Finally, machining of the slider including the foregoing layers is performed to form the air bearing surface 20 of the thin-film magnetic head including the write head and the read head. The thin-film magnetic head is thus completed.

The thin-film magnetic head thus manufactured comprises the air bearing surface 20 as the medium facing surface that faces toward a recording medium, the read head and the write head. The read head corresponds to the magnetoresistive device of the embodiment. The configuration of the magnetoresistive device will be described in detail later.

The write head incorporates the bottom pole layer 19 and the top pole layer 12 that are magnetically coupled to each other and include the pole portions that are opposed to each other and placed in regions on a side of the air bearing surface 20. The write head further incorporates: the write gap layer 9 provided between the pole portion of the bottom pole layer 19 and the pole portion of the top pole layer 12; and the thin-film coil including the portions 10 and 15 at least part of which is placed between the bottom pole layer 19 and the top pole layer 12 and insulated from the bottom pole layer 19 and the top pole layer 12. In the thin-film magnetic head, as shown in FIG. 5, throat height TH is the length from the air bearing surface 20 to the end of the insulating layer 11 closer to the air bearing surface 20. The throat height is the length (height) from the air bearing surface 20 to the point at which the distance between the two pole layers starts to increase.

Figure 1:
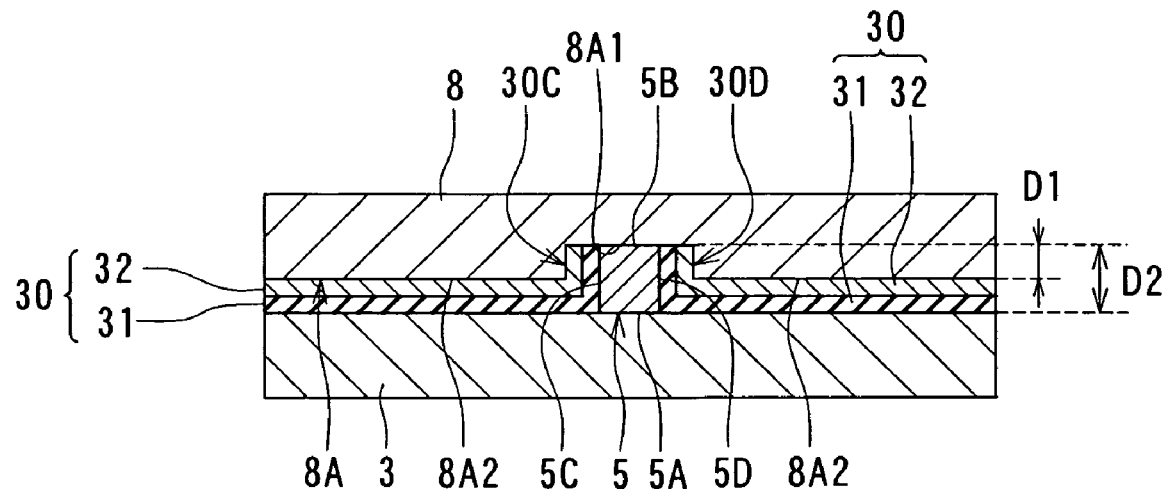
FIG. 1 is a cross-sectional view of a magnetoresistive device of a first embodiment of the invention parallel to the air bearing surface.

Reference is now made to FIG. 1 to describe the details of the configuration of the read head of the embodiment, that is, the magnetoresistive device of the embodiment. FIG. 1 is a cross-sectional view of the magnetoresistive device parallel to the air bearing surface.

The magnetoresistive device of the embodiment has the CPP structure. The magnetoresistive device comprises: the first shield layer 3 and the second shield layer 8 disposed with a space from each other in the direction of thickness; the MR element 5 disposed between the first shield layer 3 and the second shield layer 8; and a layered structure 30 disposed between the first shield layer 3 and the second shield layer 8 on both sides of the MR element 5. The MR element 5, the layered structure 30 and the second shield layer 8 are stacked on the first shield layer 3. The layered structure 30 includes the insulating layer 31 and the bias field applying layers 32. In the embodiment, the first shield layer 3 also functions as a first electrode layer, and the second shield layer 8 also functions as a second electrode layer. That is, the first and second shield layers 3 and 8 feed a sense current to the MR element 5 in the direction perpendicular to the planes of the layers making up the MR element 5. Alternatively, a pair of electrode layers may be provided on the top and bottom of the MR element 5, besides the first and second shield layers 3 and 8.

The MR element 5 has: a first surface 5A touching the first shield layer 3; a second surface 5B touching the second shield layer 8; and two side surfaces 5C and 5D facing outside in the direction of track width (the horizontal direction of FIG. 1). The second shield layer 8 has a surface 8A (the bottom surface) facing toward the first shield layer 3. The surface 8A includes: a first portion 8A1 touching the second surface 5B of the MR element 5; and second portions 8A2 disposed on both sides of the MR element 5, the sides being opposed to each other in the direction of track width. There is a difference D1 in level created between the first portion 8A1 and the second portions 8A2 such that the second portions 8A2 are closer to the first shield layer 3 than the first portion 8A1.

In the region between the first shield layer 3 and the second portions 8A2, the insulating layer 31 is located between the first shield layer 3 and the bias field applying layers 32 and touches the first shield layer 3, and the bias field applying layers 32 touch the second shield layer 8.

The layered structure 30 includes adjacent portions 30C and 30D that are adjacent to the side surfaces 5C and 5D of the MR element 5, respectively. In the adjacent portions 30C and 30D, the insulating layer 31 is located between the respective bias field applying layers 32 and the respective side surfaces 5C and 5D of the MR element 5, and touches the side surfaces 5C and 5D. In the adjacent portions 30C and 30D, the bias field applying layers 32 touch the second shield layer 8.

The layered structure 30 has a thickness smaller than a difference D2 in level between the second surface 5B of the MR element 5 and a portion of the top surface of the first shield layer 3 around the MR element 5. The insulating layer 31 has a thickness that falls within a range of 5 to 20 nm inclusive, for example. The bias field applying layers 32 each have a thickness that falls within a range of 10 to 30 nm inclusive, for example. The bias field applying layers 32 may have a structure in which a magnetic layer is disposed on an underlying film for improving the magnetic property. The magnitude of bias magnetic field generated by the bias field applying layers 32 depends on the product of the saturation flux density and the thickness of the bias field applying layers 32. Therefore, it is preferred to choose the amount of impurities that the material making up the layers 32 contains and to choose the composition of the material making up the layers 32, so that the layers 32 are capable of generating a sufficient bias magnetic field even though the thickness of the layered structure 30 is smaller than the difference D2 in level.

Figure 2:
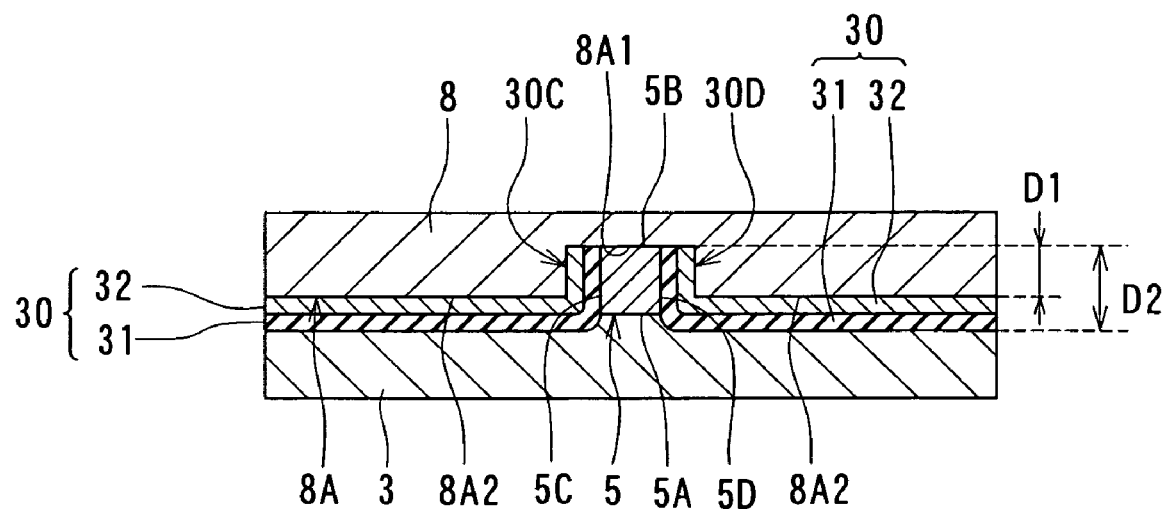
FIG. 2 is a cross-sectional view of a magnetoresistive device of a modification example of the first embodiment of the invention parallel to the air bearing surface.

Reference is now made to FIG. 2 to describe a modification example of the magnetoresistive device of the embodiment. FIG. 2 is a cross-sectional view of the magnetoresistive device of the modification example parallel to the air bearing surface. In the magnetoresistive device of FIG. 1, no difference in level is created between the first surface 5A of the MR element 5 and the portion of the top surface of the first shield layer 3 around the MR element 5. In the magnetoresistive device of FIG. 2, a difference in level is created between the first surface 5A of the MR element 5 and the portion of the top surface of the first shield layer 3 around the MR element 5, such that the portion of the top surface of the first shield layer 3 is closer to the substrate 1 than the first surface 5A. In the magnetoresistive device of FIG. 2, too, the difference D1 in level is created between the first portion 8A1 and the second portions 8A2 such that the second portions 8A2 are closer to the first shield layer 3 than the first portion 8A1. In the magnetoresistive device of FIG. 2, too, the thickness of the layered structure 30 is smaller than the difference D2 in level between the second surface 5B of the MR element 5 and the portion of the top surface of the first shield layer 3 around the MR element 5. The remainder of configuration of the magnetoresistive device of FIG. 2 is the same as that of the magnetoresistive device of FIG. 1.

If a pair of electrode layers are provided on the top and bottom of the MR element 5 besides the shield layers 3 and 8, these electrode layers have the features of the shield layers 3 and 8 relating to their shapes as described above.

The MR element 5 may be a spin-valve GMR element or a TMR element utilizing the tunnel magnetoresistive effect, for example.

Figure 3:
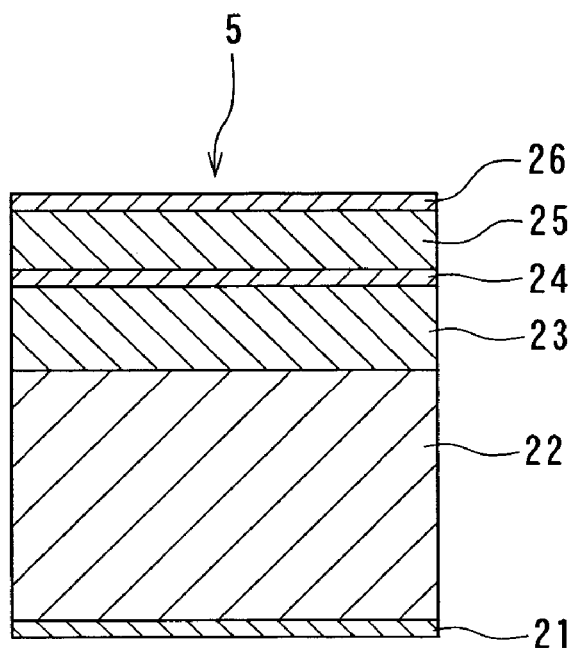
FIG. 3 is a cross-sectional view illustrating an example of configuration of layers of an MR element of the first embodiment of the invention.

FIG. 3 illustrates an example of configuration of layers of the MR element 5 when a spin-valve GMR element is employed as the MR element 5. The MR element 5 comprises an underlying layer 21, and an antiferromagnetic layer 22, a pinned layer 23, a nonmagnetic conductive layer 24, a free layer 25 and a protection layer 26 that are stacked one by one on the underlying layer 21. The pinned layer 23 is a layer in which the direction of magnetization is fixed. The antiferromagnetic layer 22 is a layer that fixes the direction of magnetization in the pinned layer 23. The underlying layer 21 is provided for improving the crystallinity and orientability of each layer formed thereon and particularly for enhancing the exchange coupling between the antiferromagnetic layer 22 and the pinned layer 23. The free layer 25 is made of a soft magnetic layer in which the direction of magnetization changes in response to a signal magnetic field sent from the recording medium. The protection layer 26 is a layer for protecting the layers therebelow.

The underlying layer 21 has a thickness of 2 to 6 nm, for example. The underlying layer 21 may be made of a layered structure made up of a Ta layer and an NiFeCr layer, for example.

The antiferromagnetic layer 22 has a thickness of 5 to 30 nm, for example, and may be made of an antiferromagnetic material including Mn and at least one element $M_{II}$ among the group consisting of Pt, Ru, Rh, Pd, Ni, Cu, Ir, Cr and Fe. The proportion of Mn preferably falls within a range of 35 to 95 atomic % inclusive. The proportion of the other element $M_{II}$ preferably falls within a range of 5 to 65 atomic % inclusive. One type of antiferromagnetic material is a non-heat-induced antiferromagnetic material that exhibits antiferromagnetism without any heat treatment and that induces an exchange coupling magnetic field between a ferromagnetic material and itself. Another type of antiferromagnetic material is a heat-induced antiferromagnetic material that exhibits antiferromagnetism when heat treatment is given. The antiferromagnetic layer 22 may be made of either of these types.

The non-heat-induced antiferromagnetic materials include an Mn alloy that has a γ phase, such as RuRhMn, FeMn, and IrMn. The heat-induced antiferromagnetic materials include an Mn alloy that has a regular crystal structure, such as PtMn, NiMn, and PtRhMn.

The direction of magnetization is fixed in the pinned layer 23 by means of the exchange coupling at the interface between the antiferromagnetic layer 22 and the pinned layer 23. The pinned layer 23 may have a structure in which a first ferromagnetic layer, a coupling layer and a second ferromagnetic layer are stacked in this order on the antiferromagnetic layer 22. The first and second ferromagnetic layers may be made of a ferromagnetic material including at least Co selected from the group consisting of Co and Fe. In particular, it is preferred that the (111) plane of this ferromagnetic material is oriented along the direction in which the layers are stacked. The two ferromagnetic layers are antiferromagnetic-coupled to each other and the directions of magnetization thereof are fixed to opposite directions. The two ferromagnetic layers each have a thickness of 3 to 7 nm, for example.

The coupling layer of the pinned layer 23 has a thickness of 0.2 to 1.2 nm, for example, and may be made of a nonmagnetic material including at least one element among the group consisting of Ru, Rh, Ir, Re, Cr, Zr and Cu. The coupling layer is provided for creating antiferromagnetic exchange coupling between the first and second ferromagnetic layers, and for fixing the magnetizations of these layers to opposite directions. The magnetizations of the first and second ferromagnetic layers in opposite directions include not only the case in which there is a difference of 180 degrees between these directions of magnetizations, but also the case in which there is a difference of 180±20 degrees between them.

The nonmagnetic conductive layer 24 has a thickness of 1.0 to 3.0 nm, for example, and may be made of a nonmagnetic conductive material that includes 80 weight % or greater of at least one element among the group consisting of Cu, Au and Ag.

The free layer 25 has a thickness of 1.0 to 8.0 nm, for example, and may be made up of a single layer or two layers or more. Here, an example in which the free layer 25 is made up of two soft magnetic layers will be given. One of the two soft magnetic layers that is closer to the nonmagnetic conductive layer 24 is called a first soft magnetic layer. The other one that is closer to the protection layer 26 is called a second soft magnetic layer.

The first soft magnetic layer has a thickness of 0.5 to 3 nm, for example, and may be made of a magnetic material including at least Co among the group consisting of Ni, Co, and Fe. To be specific, the first soft magnetic layer is preferably made of $Co_xFe_yNi_{100-(x+y)}$ in which the (111) plane is oriented along the direction in which the layers are stacked. In the formula, x and y fall within ranges of $70 \leq x \leq 100$ and $0 \leq y \leq 25$, respectively, in atomic percent.

The second soft magnetic layer has a thickness of 0.5 to 8 nm, for example, and may be made of a magnetic material including at least Ni among the group consisting of Ni, Co, Fe, Ta, Cr, Rh, Mo and Nb. To be specific, the second soft magnetic layer is preferably made of $[Ni_xCo_yFe_{100-(x+y)}]_{100-z}M_{Iz}$. In the formula, $M_I$ represents at least one of Ta, Cr, Rh, Mo and Nb. In the formula, x, y, and z fall within ranges of $75 \leq x \leq 90$, $0 \leq y \leq 15$, and $0 \leq z \leq 15$, respectively, in atomic percent.

The protection layer 26 has a thickness of 0.5 to 10 nm, for example, and may be made of Ta. The protection layer 26 may have a two-layer structure made up of a combination of a Ta layer and a Ru layer, for example, or may have a three-layer structure made up of a combination of a Ta layer, a Ru layer, and a Ta layer, for example.

A nonmagnetic conductive layer such as a Cu layer may be provided between the free layer 25 and the protection layer 26. This nonmagnetic conductive layer is provided for having the electrons passing through the free layer 25 reflected off the interface between the nonmagnetic conductive layer and the protection layer 26 and thereby increasing the MR ratio of the MR element 5 and improving the stability of the characteristics.

Figure 4:
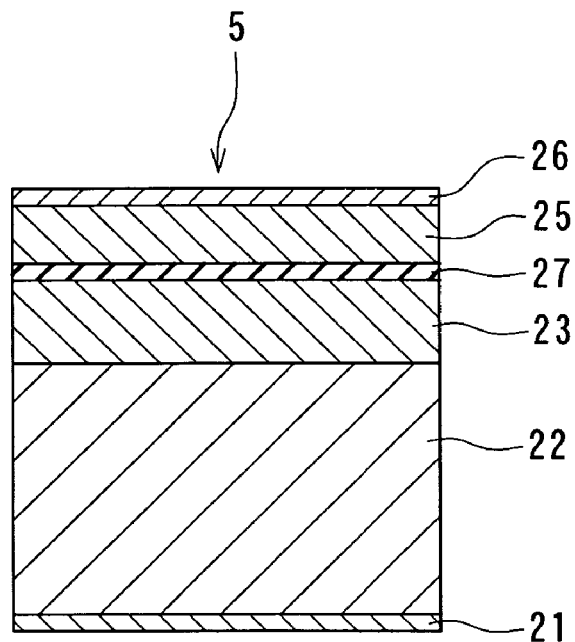
FIG. 4 is a cross-sectional view illustrating another example of configuration of layers of the MR element of the first embodiment of the invention.

FIG. 4 illustrates an example of configuration of layers of the MR element 5 when a TMR element is employed as the MR element 5. The MR element 5 has a configuration in which a tunnel barrier layer 27 made of a nonmagnetic insulating layer is provided in place of the nonmagnetic conductive layer 24 of the MR element 5 shown in FIG. 3. The tunnel barrier layer 27 is such a layer that electrons can pass therethrough while maintaining the spin by means of the tunnel effect. The tunnel barrier layer 27 has a thickness of 0.5 to 2 nm, for example, and is made of a material such as $Al_2O_3$, NiO, GdO, MgO, $Ta_2O_5$, $MoO_2$, $TiO_2$ or $WO_2$. The remainder of configuration of the MR element 5 of FIG. 4 is the same as that of the MR element 5 of FIG. 3.

The configuration of the layers of the MR element 5 may be an upside-down one of the configuration shown in FIG. 3 or FIG. 4. The layers of the MR element 5 may have a configuration of dual spin-valve in which, between the free layer 25 and the protection layer 26 of FIG. 3, a nonmagnetic conductive layer, a pinned layer and an antiferromagnetic layer that are disposed in this order from the side closer to the free layer 25 are provided, wherein the free layer is made up of a single layer and each of the nonmagnetic conductive layer, the pinned layer and the antiferromagnetic layer is made up of two layers. In this case, each of the nonmagnetic conductive layer, the pinned layer and the antiferromagnetic layer provided between the free layer 25 and the protection layer 26 has a configuration the same as that of each of the nonmagnetic conductive layer 24, the pinned layer 23 and the antiferromagnetic layer 22, respectively. The MR element 5 may have a configuration of dual spin-valve in which a layered structure made up of a first free layer, a nonmagnetic conductive layer and a second free layer is provided, wherein each of the free layers is made up of two layers, in place of the free layer 25 of the above-mentioned configuration of the dual spin-valve. The MR element 5 of FIG. 3 or FIG. 4 has a thickness of 20 to 50 nm, for example. The MR element 5 having the configuration of the dual spin-valve has a thickness of 25 to 60 nm, for example.

The operations of the magnetoresistive device and the thin-film magnetic head of the embodiment will now be described. The thin-film magnetic head writes data on a recording medium by using the write head and reads data written on the recording medium by using the magnetoresistive device as the read head.

In the magnetoresistive device, the direction of the bias magnetic field created by the bias field applying layers 32 intersects the direction orthogonal to the air bearing surface 20 at a right angle. In the MR element 5, the direction of magnetization of the free layer 25 is aligned with the direction of the bias field when no signal magnetic field exists. The direction of magnetization of the pinned layer 23 is fixed to the direction orthogonal to the air bearing surface 20.

In the MR element 5, the direction of magnetization of the free layer 25 changes in response to the signal field sent from the recording medium. The relative angle between the direction of magnetization of the free layer 25 and the direction of magnetization of the pinned layer 23 is thereby changed. As a result, the resistance of the MR element 5 changes. The resistance of the MR element 5 is obtained from the potential difference between the shield layers 3 and 8 when a sense current is fed to the MR element 5 from the shield layers 3 and 8. In such a manner, the data stored on the recording medium is read by the magnetoresistive device.

Reference is now made to FIG. 11 to FIG. 16 to describe a method of manufacturing the magnetoresistive device of the embodiment. Each of FIG. 11 to FIG. 16 is a cross-sectional view illustrating a step of the method of manufacturing the magnetoresistive device of the embodiment. Each of FIG. 11 to FIG. 16 shows the cross section parallel to the air bearing surface.

Figure 11:
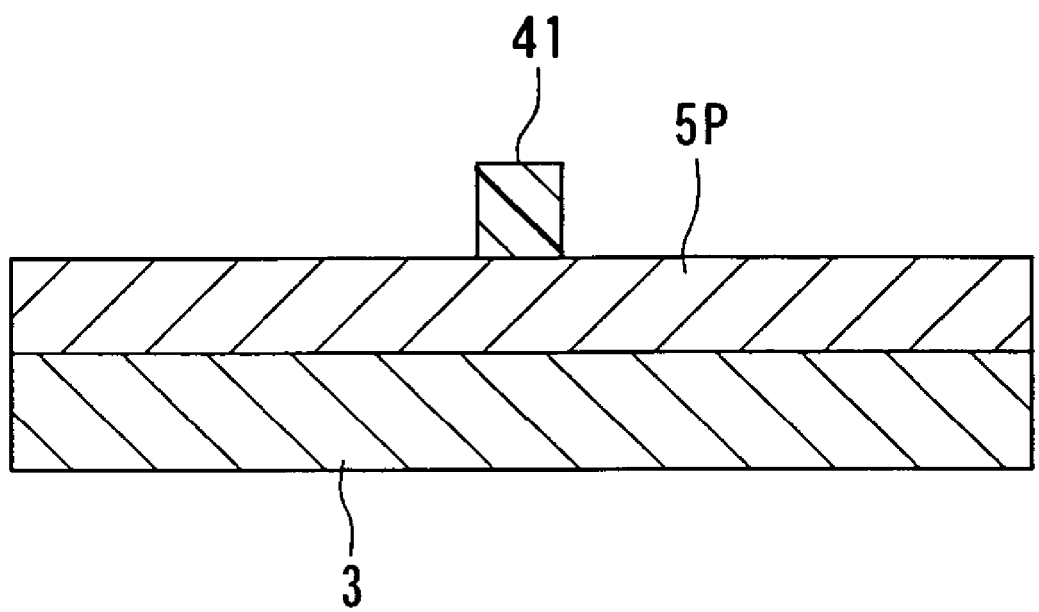
FIG. 11 is a cross-sectional view illustrating a step of a method of manufacturing the magnetoresistive device of the first embodiment of the invention.

In the method, first, the first shield layer 3 having a specific pattern is formed on the insulating layer 2 by a method such as plating or sputtering. FIG. 11 illustrates the following step.

In the step, first, an MR film 5P to be the MR element 5 is formed on the first shield layer 3 by a method such as sputtering. Next, a mask 41 for patterning the MR film 5P is formed on the MR film 5P. The mask 41 may be formed by patterning a photoresist layer, for example. FIG. 11 illustrates the mask 41 having a shape in which the sidewall thereof is orthogonal to the top surface of the MR film 5P. However, the mask 41 may have shapes that will now be described. The mask 41 may be formed by patterning a resist layer made up of two organic films stacked and may have a shape in which the lower film has a width smaller than the width of the upper film. Alternatively, the mask 41 may have a shape in which the sidewall is tilted with respect to the direction orthogonal to the top surface of the MR film 5P such that the width of the bottom surface of the mask 41 is smaller than the width of the top surface thereof. Another alternative is that the mask 41 may have a shape in which the sidewall is tilted with respect to the direction orthogonal to the top surface of the MR film 5P such that the width of the bottom surface of the mask 41 is greater than the width of the top surface thereof. If the mask 41 having this shape is used, it is possible to form the MR element 5 having a thinner line width, compared with a case in which the mask 41 having any other shape is used.

Figure 12:
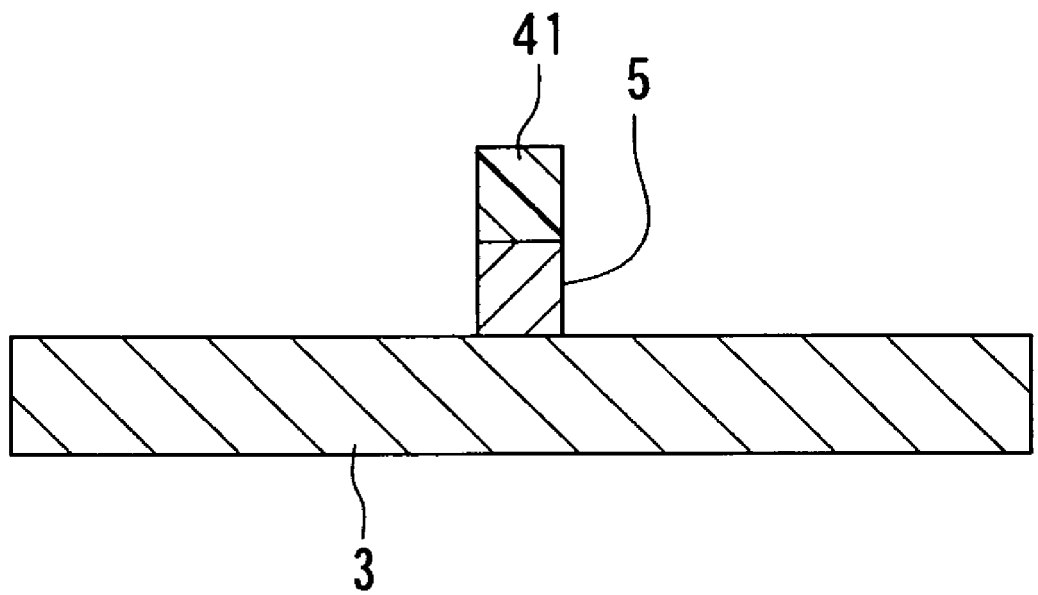
FIG. 12 is a cross-sectional view illustrating a step that follows the step shown in FIG. 11.

Next, as shown in FIG. 12, the MR film 5P is selectively etched by ion milling, for example, through the use of the mask 41 to form the MR element 5. If the MR film 5P is etched by ion milling, the MR element 5 may be formed by performing two steps of etching as will now be described to prevent a substance scattered from the MR film 5P from sticking to the sidewall of the MR element 5 and to prevent the MR element 5 from going out of a desired shape. The first step of etching is performed such that the direction in which ion beams move forms an angle of 0 degree or a relatively small angle greater than zero with respect to the direction orthogonal to the top surface of the substrate 1. The second step of etching is performed such that the direction in which ion beams move forms an angle greater than the angle of the first step with respect to the direction orthogonal to the top surface of the substrate 1 so as to remove the substance that has deposited on the sidewall of the MR element 5.

In the step of forming the MR element 5 by etching the MR film 5P, a portion of the top surface of the first shield layer 3 around the MR element 5 may be etched, too. It is thereby possible to implement the magnetoresistive device having the structure shown in FIG. 2. The depth of etching the first shield layer 3 is about 5 nm. If the depth of etching the first shield layer 3 is small, the MR element 5 will have a shape in which the sidewall thereof is tilted with respect to the direction orthogonal to the top surface of the substrate 1 such that the bottom surface of the MR element 5 is greater in width than the top surface thereof. As the depth of etching the first shield layer 3 is made greater, the sidewall of the MR element 5 is made closer to the state of being orthogonal to the top surface of the substrate 1.

Figure 13:
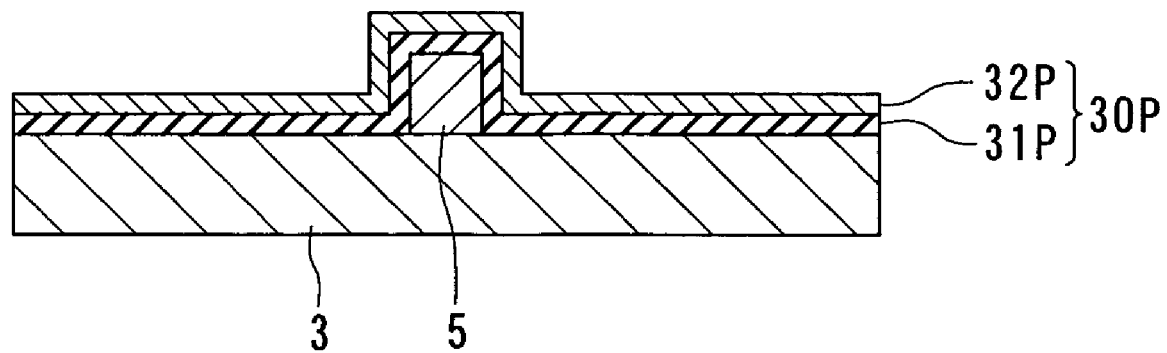
FIG. 13 is a cross-sectional view illustrating a step that follows the step shown in FIG. 12.

FIG. 13 illustrates the following step. In the step, first, the mask 41 is removed. A remover such as N-methyl-2-pyrrolidone may be used to remove the mask 41. In this case, a portion of the mask 41 near the surface thereof is removed by ashing, and then the mask 41 is removed by using the remover. It is thereby possible to prevent the mask 41 from being left unremoved. When the mask 41 is removed by using the remover, removal of the mask 41 is promoted by applying ultrasonic waves to the layered structure including the mask 41.

Next, an insulating film 31P to be the insulating layer 31 is formed by chemical vapor deposition (CVD) or sputtering, for example, to cover the first shield layer 3 and the MR element 5. Next, a film 32P to be the bias field applying layers 32 is formed by sputtering, for example, on the insulating film 31P. The insulating film 31P and the film 32P make up a layered film 30P. The layered film 30P has a thickness smaller than the difference D2 in level between the second surface 5B of the MR element 5 and the portion of the top surface of the first shield layer 3 around the MR element 5.

Figure 14:
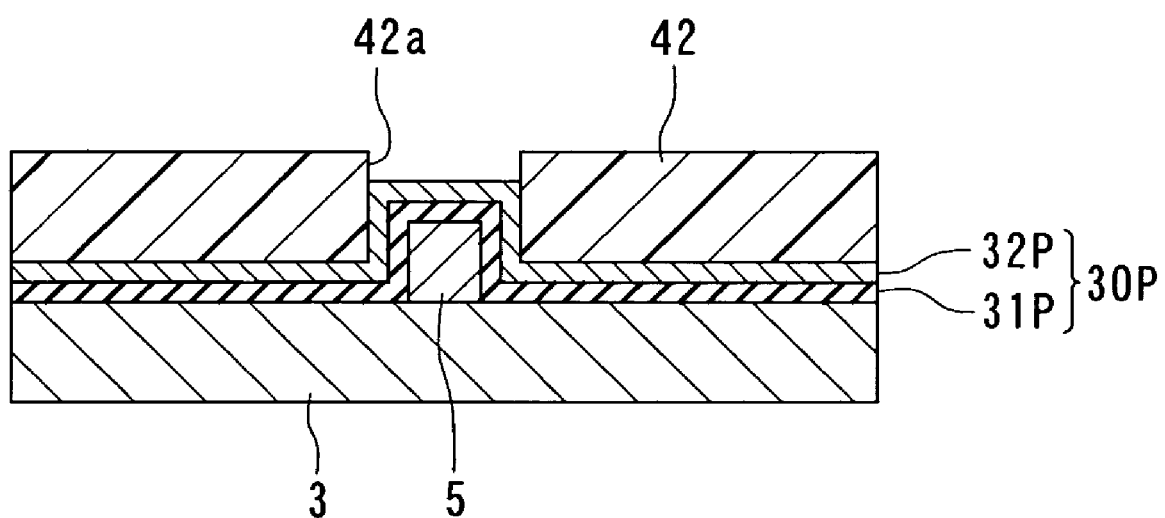
FIG. 14 is a cross-sectional view illustrating a step that follows the step shown in FIG. 13.

Next, as shown in FIG. 14, a mask 42 for patterning the films 31P and 32P is formed on the film 32P. The mask 42 has an opening 42a that exposes the top surface of a portion of the layered film 30P covering the MR element 5.

Figure 15:
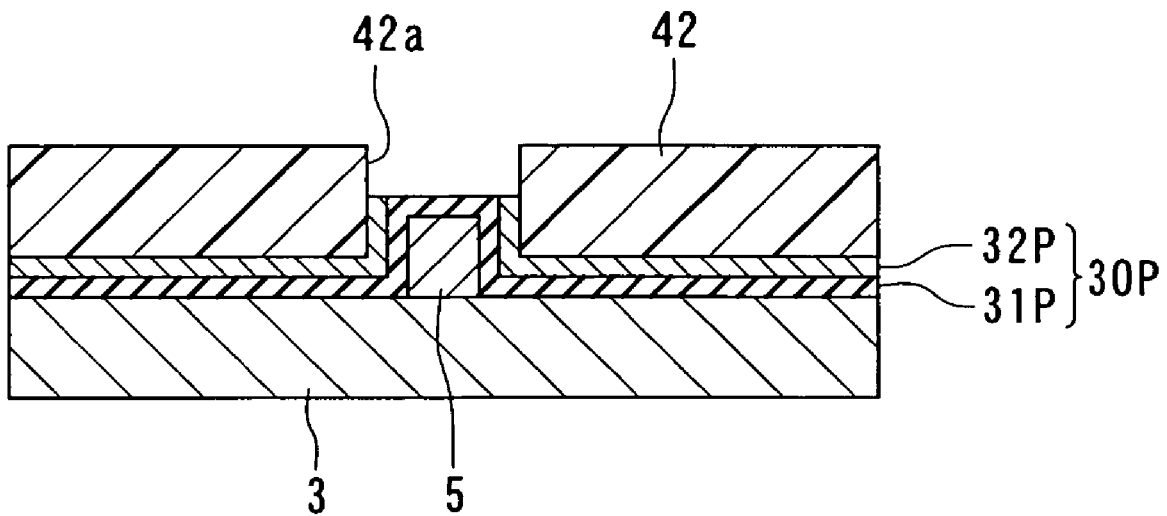
FIG. 15 is a cross-sectional view illustrating a step that follows the step shown in FIG. 14.

Next, as shown in FIG. 15, dry etching is performed to remove a portion of the film 32P exposed from the opening 42a of the mask 42. Ion milling or reactive ion etching may be employed as the dry etching.

Figure 16:
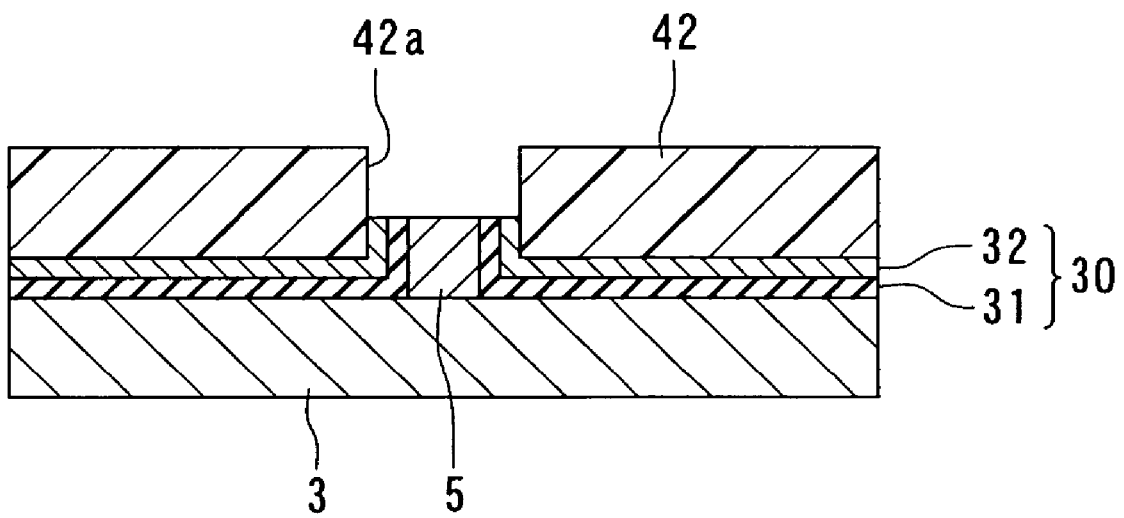
FIG. 16 is a cross-sectional view illustrating a step that follows the step shown in FIG. 15.

Next, as shown in FIG. 16, wet etching using an alkaline solvent or dry etching such as ion milling is performed to remove a portion of the film 31P exposed from the opening 42a of the mask 42.

Through the steps illustrated in FIG. 15 and FIG. 16, the portion of the layered film 30P that was located on the MR element 5 is removed, and the layered structure 30 is thereby formed of the remaining portion of the layered film 30P.

Next, the mask 42 is removed, and then, the second shield layer 8 is formed on the MR element 5 and the layered structure 30 by a method such as plating or sputtering, as shown in FIG. 1. If plating is employed to form the second shield layer 8, the second shield layer 8 may be formed through a method that will now be described. First, an electrode film for plating is formed on the MR element 5 and the layered structure 30. Next, the second shield layer 8 is formed on the electrode film by pattern plating. Next, the electrode film except a portion located below the second shield layer 8 is removed. The electrode film may be a layered film made up of a nonmagnetic conductive film and a magnetic film.

According to the embodiment as described so far, the second shield layer 8 that also functions as the second electrode layer has the surface 8A facing toward the first shield layer 3 that also functions as the first electrode layer. This surface 8A includes: the first portion 8A1 touching the second surface (the top surface) 5B of the MR element 5; and the second portions 8A2 disposed on both sides of the MR element 5, the sides being opposed to each other in the direction of track width. There is the difference D1 in level created between the first portion 8A1 and the second portions 8A2 such that the second portions 8A2 are closer to the first shield layer 3 than the first portion 8A1. According to the embodiment, the layered structure 30 including the insulating layer 31 and the bias field applying layers 32 is located between the first shield layer 3 and the second shield layer 8 on both sides of the MR element 5. The layered structure 30 has a thickness smaller than the difference D2 in level between the second surface 5B of the MR element 5 and the portion of the top surface of the first shield layer 3 around the MR element 5. Therefore, no insulating layer having a thickness nearly equal to the difference D2 in level is disposed around the MR element 5. Consequently, it is also impossible that a thick insulating layer is formed on the second surface 5B of the MR element 5 in the course of manufacturing process of the magnetoresistive device. As a result, it is possible to form the magnetoresistive device with precision. According to the embodiment, it is possible to define the shield gap length with accuracy, in particular.

According to the method of manufacturing the magnetoresistive device of the embodiment, after the MR element 5 is formed, the layered film 30P including the insulating film 31P to be the insulating layer 31 and the film 32P to be the bias field applying layers 32 is formed to cover the first shield layer 3 and the MR element 5. Next, the portion of the layered film 30P located on the MR element 5 is removed and the layered structure 30 is thereby formed of the remaining portion of the layered film 30P. Next, the second shield layer 8 is formed on the MR element 5 and the layered structure 30. The layered film 30P has a thickness smaller than the difference D2 in level between the second surface 5B of the MR element 5 and the portion of the top surface of the first shield layer 3 around the MR element 5. Therefore, it is easy to remove the portion of the layered film 30P located on the MR element 5 in the course of manufacturing process of the magnetoresistive device. In addition, according to the embodiment, it is possible to prevent an unwanted insulating layer from remaining on the MR element 5 and to prevent a portion of the MR element 5 from being cut away. These features of the embodiment make it possible to form the magnetoresistive device with precision. According to the embodiment, it is possible to define the shield gap length with accuracy, in particular.

According to the embodiment, the distance between the top surface of the first shield layer 3 and the second portions 8A2 of the surface 8A of the second shield layer 8 is smaller than the thickness of the MR element 5. As a result, the functions of the shield layers 3 and 8 exerted on the MR element 5 are improved. To be specific, it is possible to prevent an unwanted magnetic field from being applied to the MR element 5 in the direction of track width. It is thereby possible to reduce the noise of output signals of the magnetoresistive device.

Figure 7:
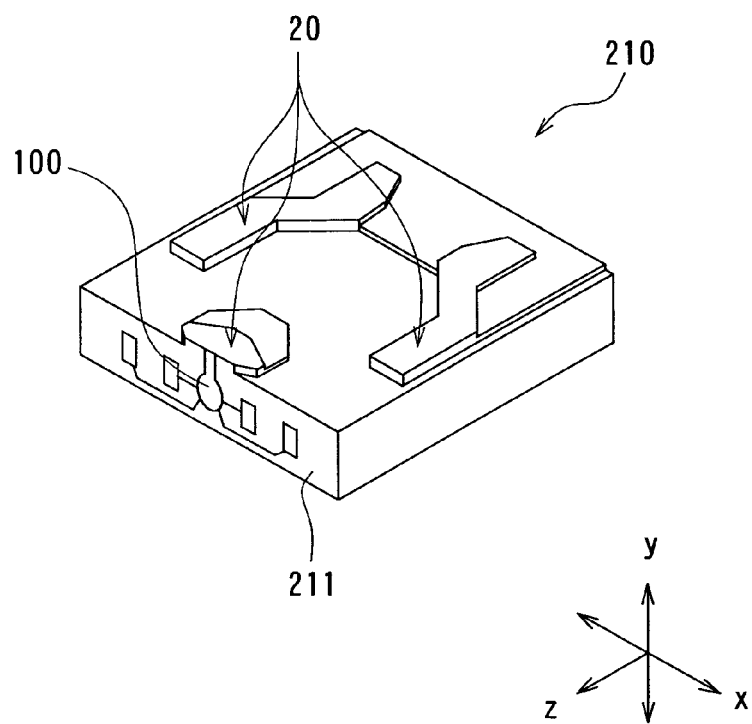
FIG. 7 is a perspective view illustrating a slider incorporated in a head gimbal assembly of the first embodiment of the invention.

A head gimbal assembly, a head arm assembly and a magnetic disk drive of the embodiment will now be described. Reference is made to FIG. 7 to describe a slider 210 incorporated in the head gimbal assembly. In the magnetic disk drive, the slider 210 is placed to face toward a magnetic disk platter that is a circular-plate-shaped recording medium to be rotated and driven. The slider 210 has a base body 211 made up mainly of the substrate 1 and the overcoat layer 17 of FIG. 5. The base body 211 is nearly hexahedron-shaped. One of the six surfaces of the base body 211 faces toward the magnetic disk platter. The air bearing surface 20 is formed in this one of the surfaces. When the magnetic disk platter rotates in the z direction of FIG. 7, an airflow passes between the magnetic disk platter and the slider 210, and a lift is thereby generated below the slider 210 in the y direction of FIG. 7 and exerted on the slider 210. The slider 210 flies over the magnetic disk platter by means of the lift. The x direction of FIG. 7 is across the tracks of the magnetic disk platter. A thin-film magnetic head 100 of the embodiment is formed near the air-outflow-side end (the end located at the lower left of FIG. 7) of the slider 210.

Figure 8:
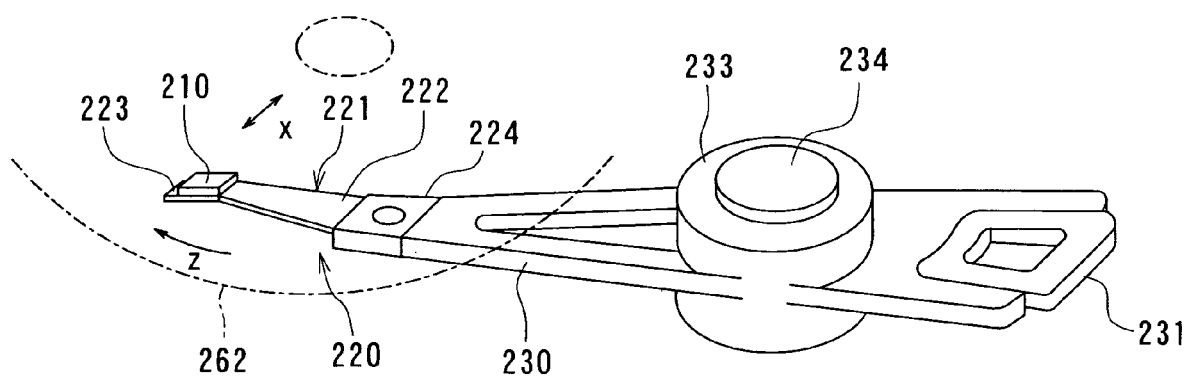
FIG. 8 is a perspective view illustrating a head arm assembly of the first embodiment of the invention.

Reference is now made to FIG. 8 to describe the head gimbal assembly 220 of the embodiment. The head gimbal assembly 220 comprises the slider 210 and a suspension 221 that flexibly supports the slider 210. The suspension 221 incorporates: a plate-spring-shaped load beam 222 made of stainless steel, for example; a flexure 223 to which the slider 210 is joined, the flexure 223 being located at an end of the load beam 222 and giving an appropriate degree of freedom to the slider 210; and a base plate 224 located at the other end of the load beam 222. The base plate 224 is attached to an arm 230 of an actuator for moving the slider 210 along the x direction across the tracks of the magnetic disk platter 262. The actuator incorporates the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembled body comprising the arm 230 and the head gimbal assembly 220 attached to the arm 230 is called a head arm assembly. An assembled body comprising a carriage having a plurality of arms wherein the head gimbal assembly 220 is attached to each of the arms is called a head stack assembly.

FIG. 8 illustrates the head arm assembly of the embodiment. In the head arm assembly, the head gimbal assembly 220 is attached to an end of the arm 230. A coil 231 that is part of the voice coil motor is fixed to the other end of the arm 230. A bearing 233 is provided in the middle of the arm 230. The bearing 233 is attached to an axis 234 that rotatably supports the arm 230.

Figure 9:
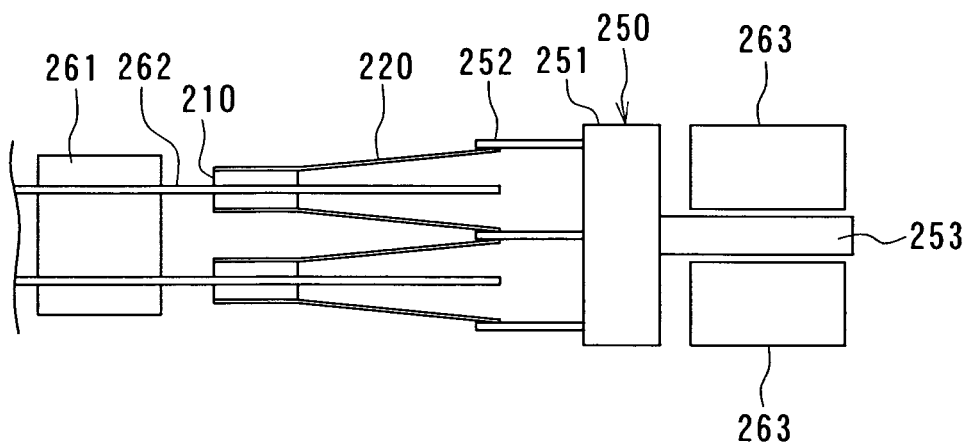
FIG. 9 is a view for illustrating the main part of a magnetic disk drive of the first embodiment of the invention.
Figure 10:
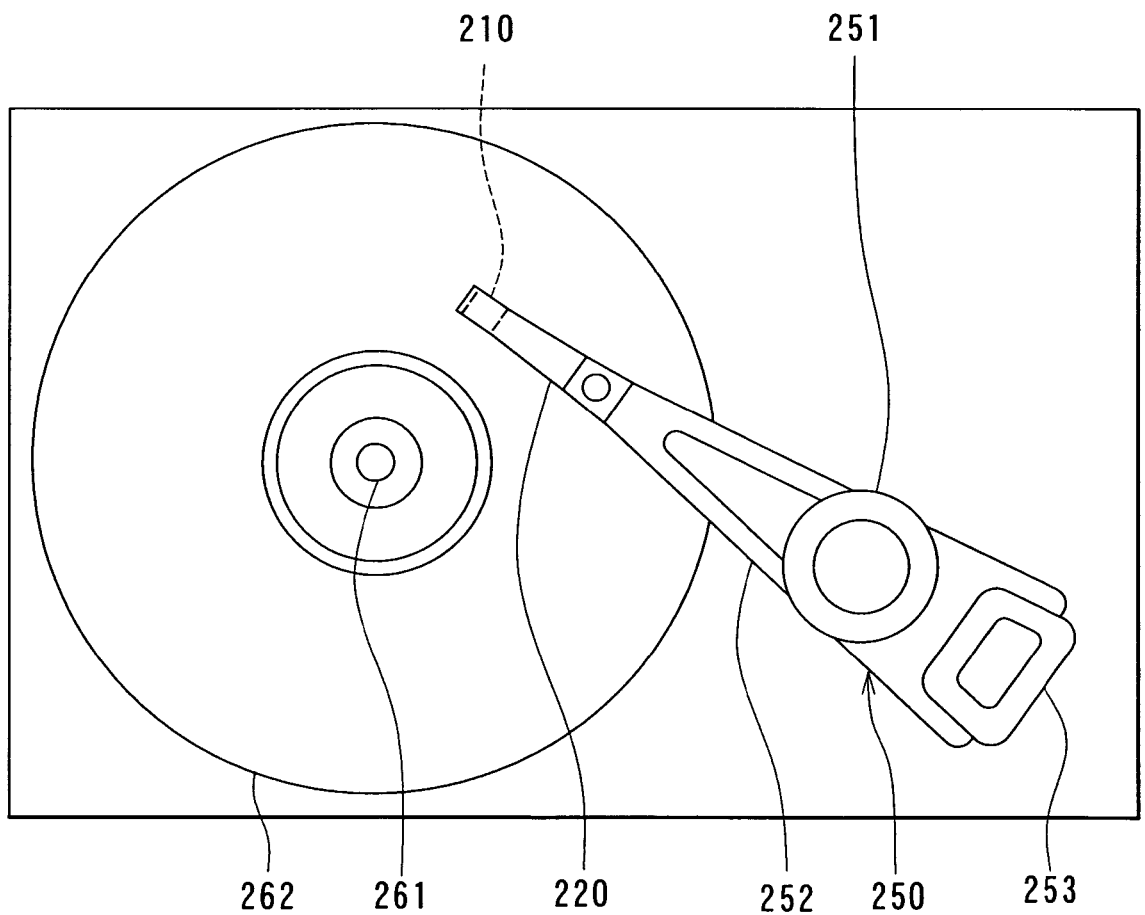
FIG. 10 is a top view of the magnetic disk drive of the first embodiment of the invention.

Reference is now made to FIG. 9 and FIG. 10 to describe an example of the head stack assembly and the magnetic disk drive of the embodiment. FIG. 9 illustrates the main part of the magnetic disk drive. FIG. 10 is a top view of the magnetic disk drive. The head stack assembly 250 incorporates a carriage 251 having a plurality of arms 252. A plurality of head gimbal assemblies 220 are attached to the arms 252 such that the assemblies 220 are arranged in the vertical direction with spacing between adjacent ones. A coil 253 that is part of the voice coil motor is mounted on the carriage 251 on a side opposite to the arms 252. The head stack assembly 250 is installed in the magnetic disk drive. The magnetic disk drive includes a plurality of magnetic disk platters 262 mounted on a spindle motor 261. Two of the sliders 210 are allocated to each of the platters 262, such that the two sliders 210 are opposed to each other with each of the platters 262 disposed in between. The voice coil motor includes permanent magnets 263 disposed to be opposed to each other, the coil 253 of the head stack assembly 250 being placed between the magnets 263.

The actuator and the head stack assembly 250 except the sliders 210 correspond to the alignment device of the invention and support the sliders 210 and align them with respect to the magnetic disk platters 262.

In the magnetic disk drive of the embodiment, the actuator moves the slider 210 across the tracks of the magnetic disk platter 262 and aligns the slider 210 with respect to the magnetic disk platter 262. The thin-film magnetic head incorporated in the slider 210 writes data on the magnetic disk platter 262 through the use of the write head and reads data stored on the magnetic disk platter 262 through the use of the magnetoresistive device as the read head.

The head gimbal assembly, the head arm assembly and the magnetic disk drive of the embodiment exhibit effects similar to those of the foregoing thin-film magnetic head of the embodiment.

Second Embodiment

Figure 17:
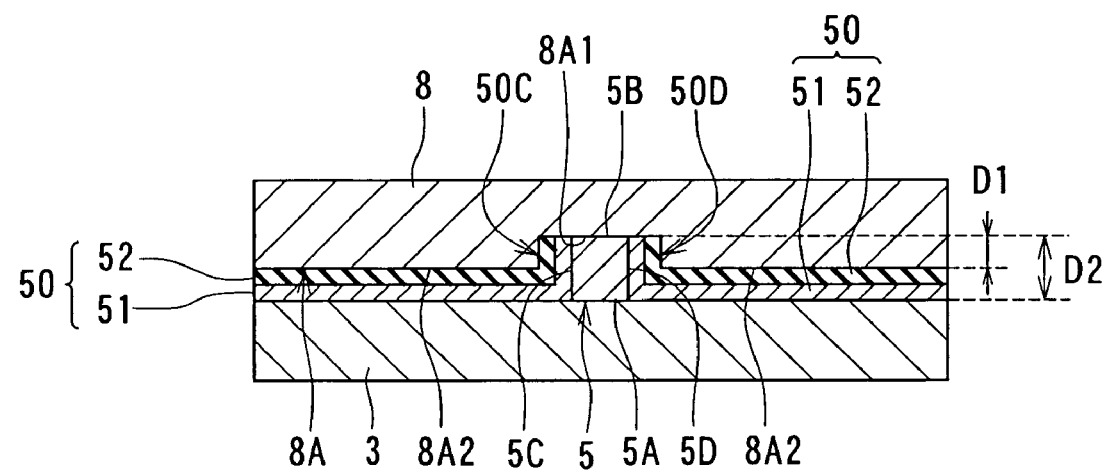
FIG. 17 is a cross-sectional view of a magnetoresistive device of a second embodiment of the invention parallel to the air bearing surface.

Reference is now made to FIG. 17 to describe the configuration of a magnetoresistive device of a second embodiment of the invention. FIG. 17 is a cross-sectional view illustrating the cross section of the magnetoresistive device parallel to the air bearing surface. The magnetoresistive device of the second embodiment comprises a layered structure 50 in place of the layered structure 30 of the first embodiment. The layered structure 50 includes bias field applying layers 51 and an insulating layer 52.

In the region between the first shield layer 3 and the second portions 8A2 of the surface 8A of the second shield layer 8, the bias field applying layers 51 touch the first shield layer 3, and the insulating layer 52 is located between the second shield layer 8 and the bias field applying layers 51 and touches the second shield layer 8.

The layered structure 50 includes adjacent portions 50C and 50D that are adjacent to the side surfaces 5C and 5D of the MR element 5, respectively. In the adjacent portions 50C and 50D, the bias field applying layers 51 are located between the insulating layer 52 and the respective side surfaces 5C and 5D of the MR element 5, and touch the side surfaces 5C and 5D. In the adjacent portions 50C and 50D, the insulating layer 52 touches the second shield layer 8.

The layered structure 50 has a thickness smaller than the difference D2 in level between the second surface 5B of the MR element 5 and the portion of the top surface of the first shield layer 3 around the MR element 5. The thickness and material of the bias field applying layers 51 are the same as those of the bias field applying layers 32 of the first embodiment. The thickness and material of the insulating layer 52 are the same as those of the insulating layer 31 of the first embodiment. A material having a high resistance such as ferrite or an amorphous magnetic material may be used for the material of the bias field applying layers 51 to increase the resistance of the portion between the shield layers 3 and 8 except the MR element 5.

In the second embodiment, a difference in level may be created between the first surface 5A of the MR element 5 and the portion of the top surface of the first shield layer 3 around the MR element 5, such that the portion of the top surface of the first shield layer 3 is closer to the substrate 1 than the first surface 5A, as in the modification example of the first embodiment illustrated in FIG. 2.

The remainder of configuration of the magnetoresistive device of the second embodiment is similar to that of the first embodiment.

Reference is now made to FIG. 18 to FIG. 21 to describe a method of manufacturing the magnetoresistive device of the second embodiment. Each of FIG. 18 to FIG. 21 is a cross-sectional view illustrating a step of the method of manufacturing the magnetoresistive device of the embodiment. Each of FIG. 18 to FIG. 21 shows the cross section parallel to the air bearing surface.

The method of the second embodiment includes the steps up to the step of removing the mask 41 after the MR element 5 is formed that are the same as those of the first embodiment.

Figure 18:
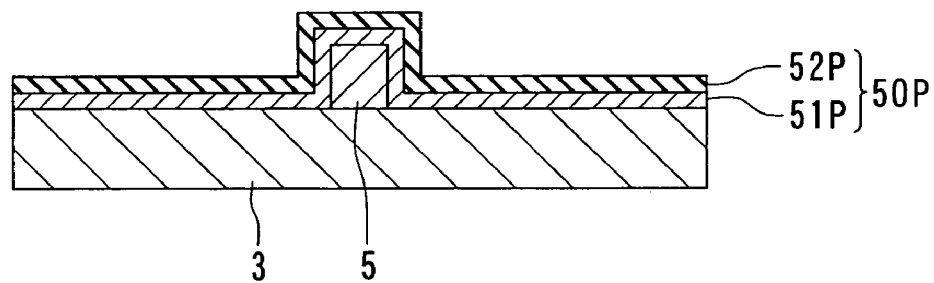
FIG. 18 is a cross-sectional view illustrating a step of a method of manufacturing the magnetoresistive device of the second embodiment of the invention.

FIG. 18 illustrates the following step. In the step, first, a film 51P to be the bias field applying layers 51 is formed by sputtering, for example, to cover the first shield layer 3 and the MR element 5. Next, an insulating film 52P to be the insulating layer 52 is formed by CVD or sputtering, for example, on the film 51R The film 51P and the insulating film 52P make up a layered film 50P. The layered film 50P has a thickness smaller than the difference D2 in level between the second surface 5B of the MR element 5 and the portion of the top surface of the first shield layer 3 around the MR element 5.

Figure 19:
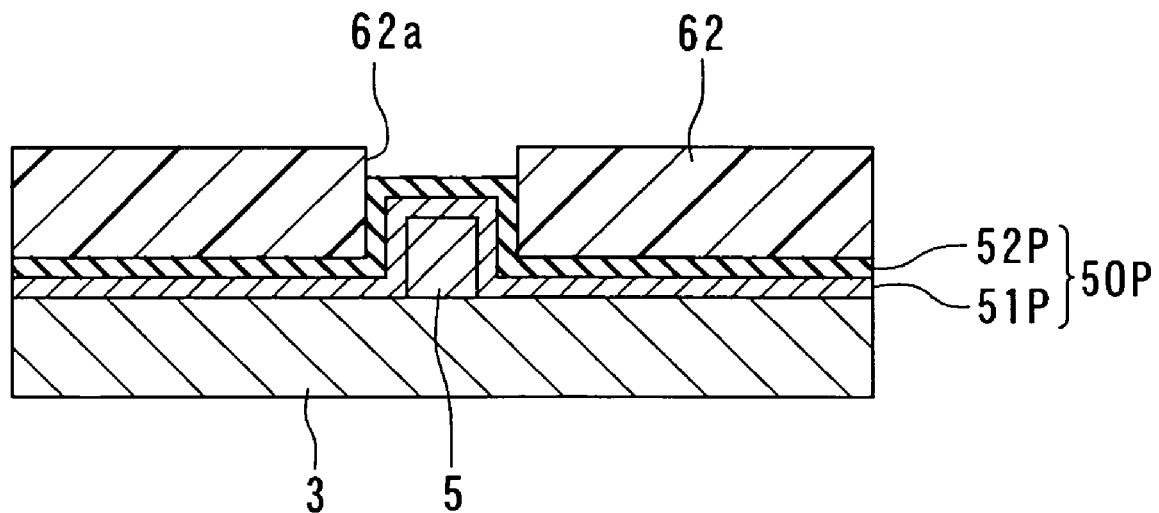
FIG. 19 is a cross-sectional view illustrating a step that follows the step shown in FIG. 18.

Next, as shown in FIG. 19, a mask 62 for patterning the films 51P and 52P is formed on the insulating film 52P. The mask 62 has an opening 62a from which the top surface of a portion of the layered film 50P covering the MR element 5 is exposed.

Figure 20:
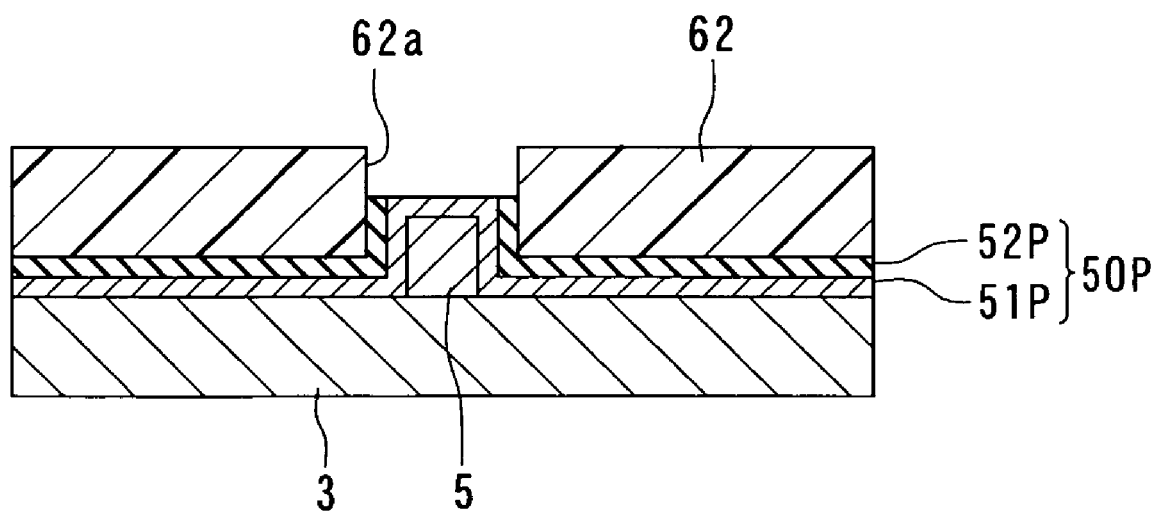
FIG. 20 is a cross-sectional view illustrating a step that follows the step shown in FIG. 19.

Next, as shown in FIG. 20, wet etching using an alkaline solvent or dry etching such as ion milling is performed to remove a portion of the insulating film 52P exposed from the opening 62a of the mask 62.

Figure 21:
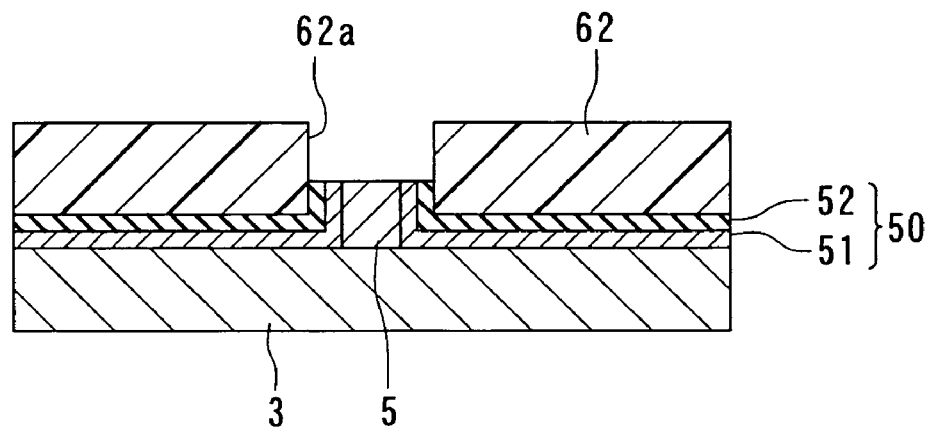
FIG. 21 is a cross-sectional view illustrating a step that follows the step shown in FIG. 20.

Next, as shown in FIG. 21, dry etching is performed to remove a portion of the film 51P exposed from the opening 62a of the mask 62. Ion milling or reactive ion etching may be employed as the dry etching.

Through the steps illustrated in FIG. 20 and FIG. 21, the portion of the layered film 50P that was located on the MR element 5 is removed, and the layered structure 50 is thereby formed of the remaining portion of the layered film 50P.

Next, the mask 62 is removed, and then, the second shield layer 8 is formed on the MR element 5 and the layered structure 50, as shown in FIG. 17. The method of forming the second shield layer 8 is the same as that of the first embodiment.

The remainder of configuration, operation and effects of the second embodiment are similar to those of the first embodiment.

Third Embodiment

Figure 22:
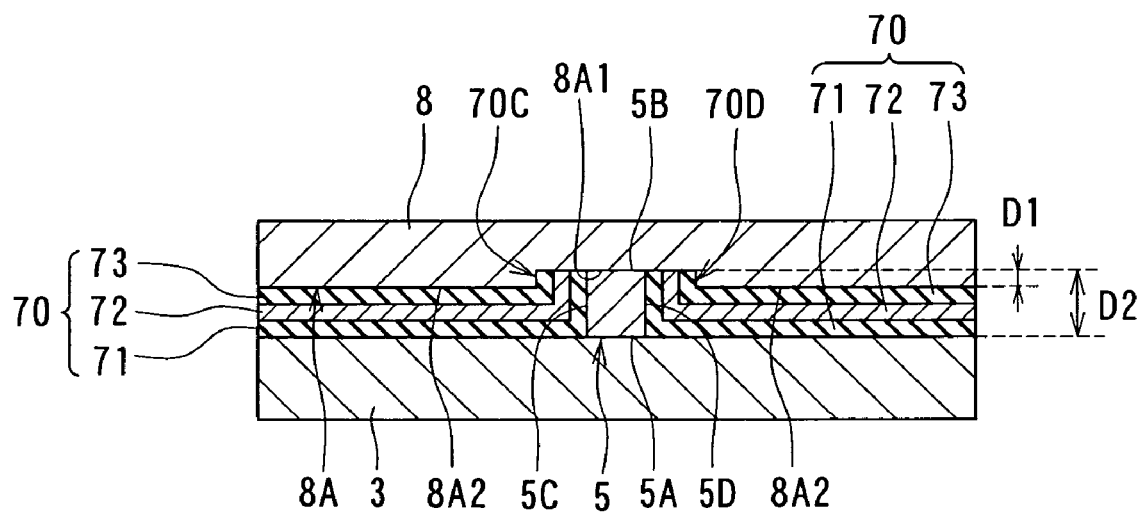
FIG. 22 is a cross-sectional view of a magnetoresistive device of a third embodiment of the invention parallel to the air bearing surface.

Reference is now made to FIG. 22 to describe the configuration of a magnetoresistive device of a third embodiment of the invention. FIG. 22 is a cross-sectional view illustrating the cross section of the magnetoresistive device parallel to the air bearing surface. The magnetoresistive device of the third embodiment comprises a layered structure 70 in place of the layered structure 30 of the first embodiment. The layered structure 70 includes a first insulating layer 71, bias field applying layers 72 and a second insulating layer 73.

In the region between the first shield layer 3 and the second portions 8A2 of the surface 8A of the second shield layer 8, the first insulating layer 71 is located between the first shield layer 3 and the bias field applying layers 72, and touches the first shield layer 3. In the region between the first shield layer 3 and the second portions 8A2, the second insulating layer 73 is located between the second shield layer 8 and the bias field applying layers 72, and touches the second shield layer 8.

The layered structure 70 includes adjacent portions 70C and 70D that are adjacent to the side surfaces 50C and 5D of the MR element 5, respectively. In the adjacent portions 70C and 70D, the first insulating layer 71 is located between the respective bias field applying layers 72 and the respective side surfaces 5C and 5D of the MR element 5, and touches the side surfaces 5C and 5D. In the adjacent portions 70C and 70D, the second insulating layer 73 is located between the respective bias field applying layers 72 and the second shield layer 8, and touches the second shield layer 8.

The layered structure 70 has a thickness smaller than the difference D2 in level between the second surface 5B of the MR element 5 and the portion of the top surface of the first shield layer 3 around the MR element 5. The thickness and material of the insulating layers 71 and 73 are the same as those of the insulating layer 31 of the first embodiment. The thickness and material of the bias field applying layers 72 are the same as those of the bias field applying layers 32 of the first embodiment.

In the third embodiment, a difference in level may be created between the first surface 5A of the MR element 5 and the portion of the top surface of the first shield layer 3 around the MR element 5, such that the portion of the top surface of the first shield layer 3 is closer to the substrate 1 than the first surface 5A, as in the modification example of the first embodiment illustrated in FIG. 2.

The remainder of configuration of the magnetoresistive device of the third embodiment is similar to that of the first embodiment.

Reference is now made to FIG. 23 to FIG. 26 to describe a method of manufacturing the magnetoresistive device of the third embodiment. Each of FIG. 23 to FIG. 26 is a cross-sectional view illustrating a step of the method of manufacturing the magnetoresistive device of the embodiment. Each of FIG. 23 to FIG. 26 shows the cross section parallel to the air bearing surface.

The method of the third embodiment includes the steps up to the step of removing the mask 41 after the MR element 5 is formed that are the same as those of the first embodiment.

Figure 23:
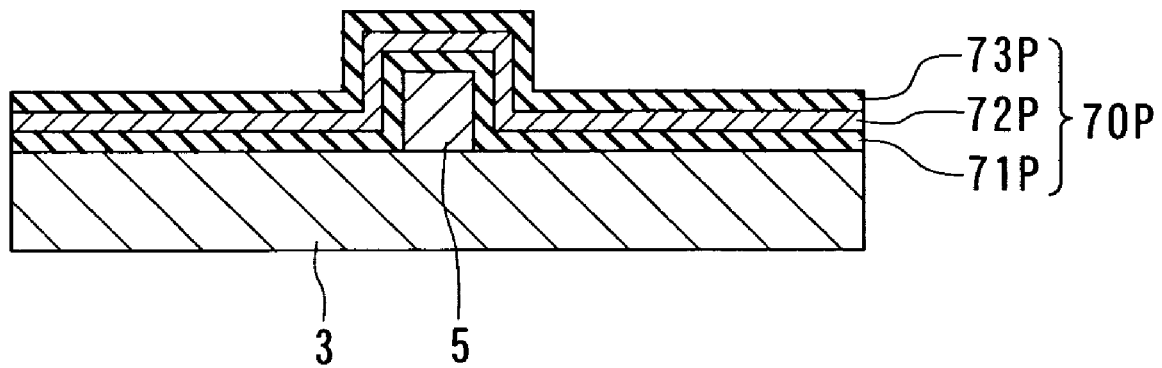
FIG. 23 is a cross-sectional view illustrating a step of a method of manufacturing the magnetoresistive device of the third embodiment of the invention.

FIG. 23 illustrates the following step. In the step, first, an insulating film 71P to be the insulating layer 71 is formed by CVD or sputtering, for example, to cover the first shield layer 3 and the MR element 5. Next, a film 72P to be the bias field applying layers 72 is formed by sputtering, for example, on the insulating film 71P. Next, an insulating film 73P to be the insulating layer 73 is formed by CVD or sputtering, for example, on film 72P. The films 71P, 72P and 73P make up a layered film 70P. The layered film 70P has a thickness smaller than the difference D2 in level between the second surface 5B of the MR element 5 and the portion of the top surface of the first shield layer 3 around the MR element 5.

Figure 24:
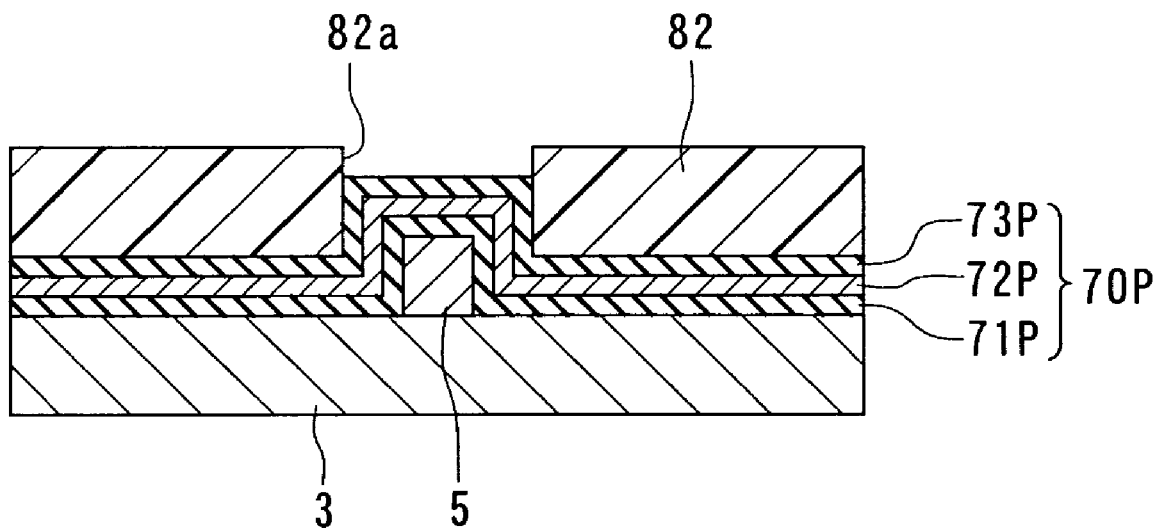
FIG. 24 is a cross-sectional view illustrating a step that follows the step shown in FIG. 23.

Next, as shown in FIG. 24, a mask 82 for patterning the films 71P, 72P and 73P is formed on the insulating film 73P. The mask 82 has an opening 82a from which the top surface of a portion of the layered film 70P covering the MR element 5 is exposed.

Figure 25:
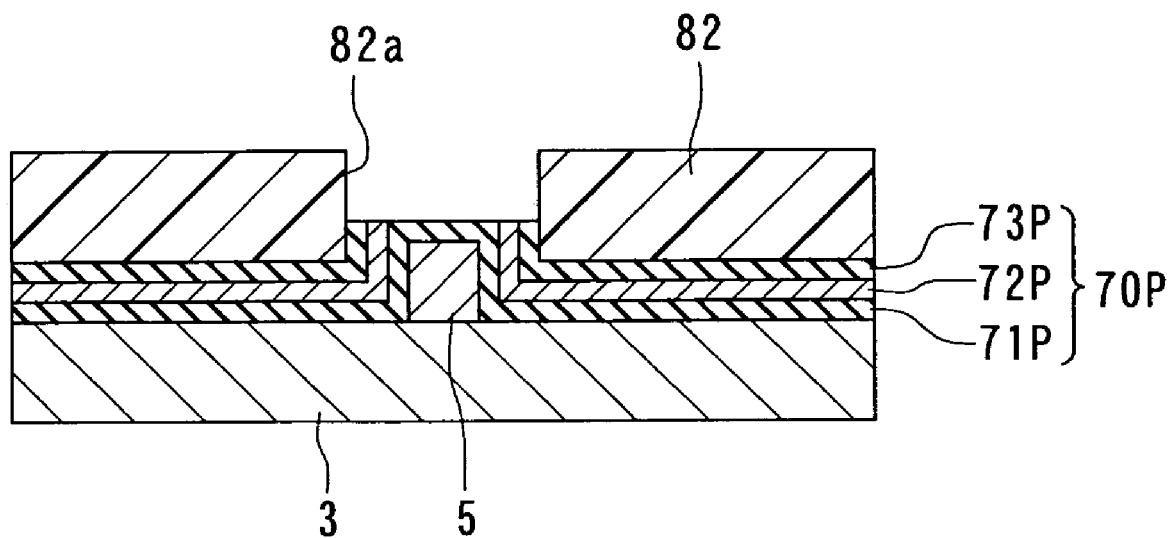
FIG. 25 is a cross-sectional view illustrating a step that follows the step shown in FIG. 24.

FIG. 25 illustrates the following step. In the step, first, dry etching is performed to remove a portion of the insulating film 73P exposed from the opening 82a of the mask 82. A portion of the film 72P is thereby exposed from the opening 82a of the mask 82. Next, dry etching is performed to remove a portion of the film 72P exposed from the opening 82a of the mask 82. Ion milling or reactive ion etching may be employed as the dry etching.

Figure 26:
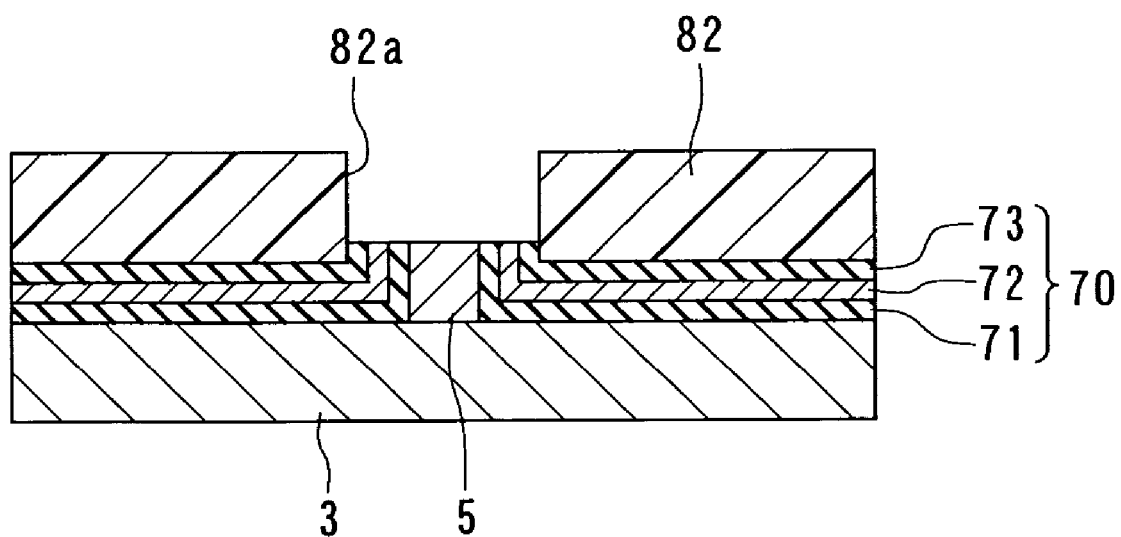
FIG. 26 is a cross-sectional view illustrating a step that follows the step shown in FIG. 25.
Figure 27:
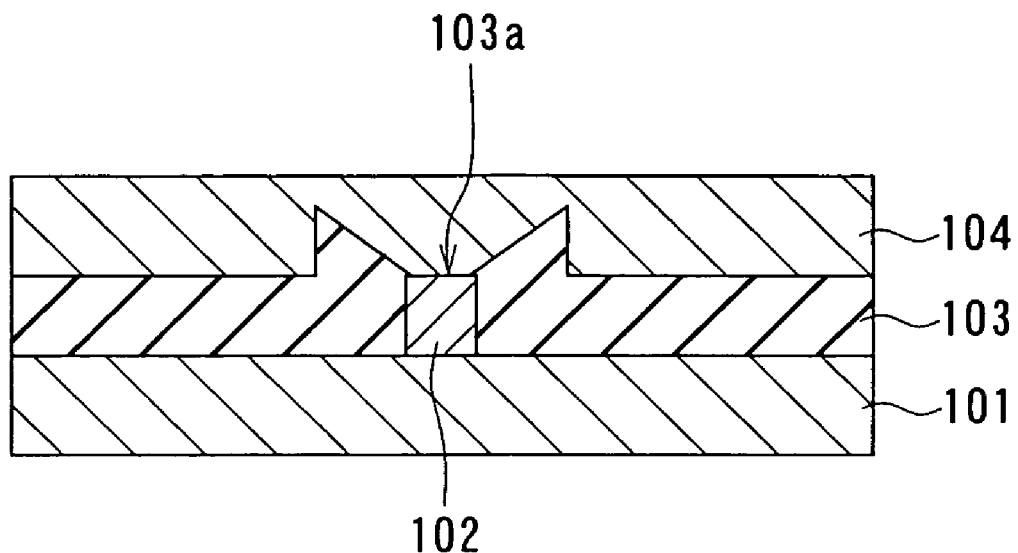
FIG. 27 is a cross-sectional view illustrating an example of method of manufacturing a head having the CPP structure.
Figure 28:
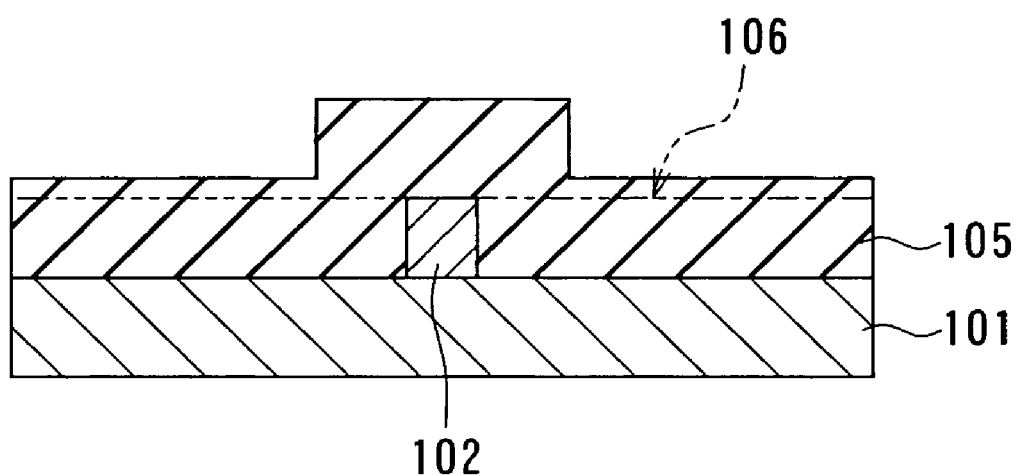
FIG. 28 is a cross-sectional view illustrating another example of method of manufacturing the head having the CPP structure.
Figure 29:
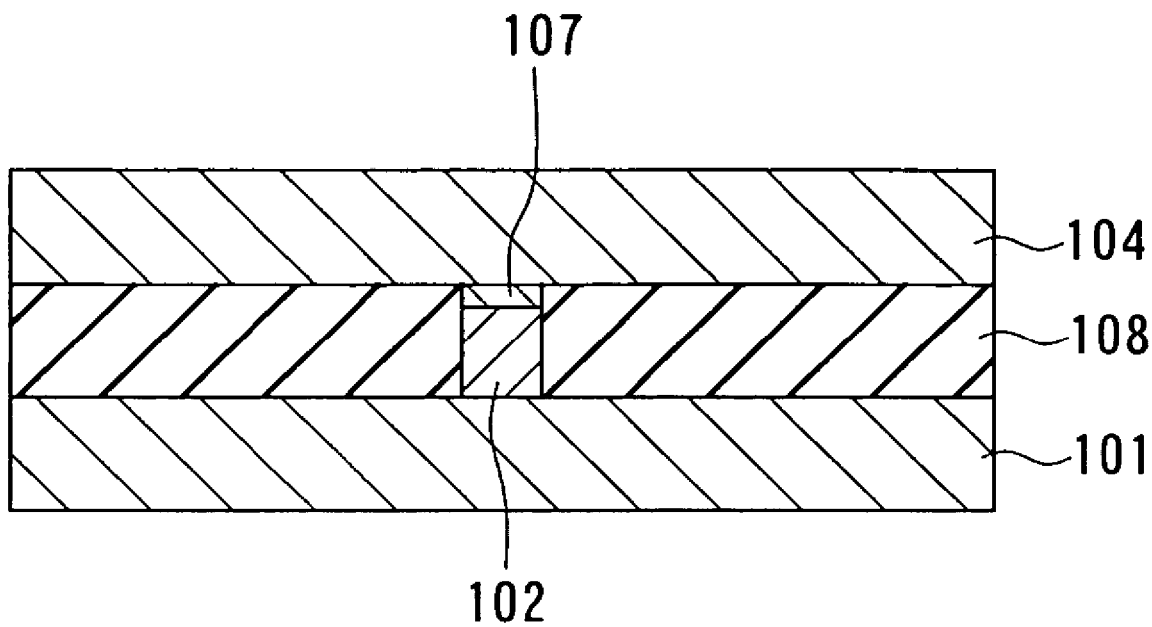
FIG. 29 is a cross-sectional view illustrating still another example of method of manufacturing the head having the CPP structure.

Next, as shown in FIG. 26, wet etching using an alkaline solvent or dry etching such as ion milling is performed to remove a portion of the insulating film 71P exposed from the opening 82a of the mask 82.

Through the steps illustrated in FIG. 25 and FIG. 26, the portion of the layered film 70P that was located on the MR element 5 is removed, and the layered structure 70 is thereby formed of the remaining portion of the layered film 70P.

Next, the mask 82 is removed, and then, the second shield layer 8 is formed on the MR element 5 and the layered structure-70, as shown in FIG. 22. The method of forming the second shield layer 8 is the same as that of the first embodiment.

According to the third embodiment, the insulating layers 71 and 73 are provided to sandwich the bias field applying layers 72. It is thereby possible to improve the insulation in a region between the shield layers 3 and 8 except the MR element 5. The remainder of configuration, operation and effects of the third embodiment are similar to those of the first embodiment.

The present invention is not limited to the foregoing embodiments but may be practiced in still other ways. For example, in the foregoing embodiments, the thin-film magnetic head is disclosed, comprising the read head formed on the base body and the write head stacked on the read head. Alternatively, the read head may be stacked on the write head.

The thin-film magnetic head may have a configuration comprising the read head only if the thin-film magnetic head is dedicated to reading.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a magnetoresistive device comprising:
   a first electrode layer and a second electrode layer disposed with a space from each other in a direction of thickness;
   a magnetoresistive element disposed between the first and second electrode layers and having a first surface touching the first electrode layer and a second surface touching the second electrode layer; and
   a layered structure disposed between the first and second electrode layers on both sides of the magnetoresistive element, the layered structure including an insulating layer and bias field applying layers for applying a bias magnetic field to the magnetoresistive element, wherein:
   the magnetoresistive element, the layered structure and the second electrode layer are stacked on the first electrode layer;
   the second electrode layer has a surface facing toward the first electrode layer, the surface including a first portion touching the second surface of the magnetoresistive element and second portions disposed on both sides of the magnetoresistive element;
   a difference in level is created between the first portion and the second portions such that the second portions are closer to the first electrode layer than the first portion; and
   the layered structure includes adjacent portions that are adjacent to side surfaces of the magnetoresistive element and are sandwiched between the second electrode layer and the respective side surfaces of the magnetoresistive element, the adjacent portions including portions of the insulating layer and portions of the bias field applying layers,
   the method comprising the steps of:
   forming the first electrode layer;
   forming the magnetoresistive element on the first electrode layer;
   forming a layered film so as to cover the first electrode layer and the magnetoresistive element, the layered film including a film to be the bias field applying layers and an insulating film to be the insulating layer;
   forming the layered structure by removing a portion of the layered film located on the magnetoresistive element and thereby forming the remaining portion of the layered film into the layered structure; and
   forming the second electrode layer on the magnetoresistive element and the layered structure, wherein
   the layered film is made to have a thickness smaller than a difference in level between the second surface of the magnetoresistive element and a top surface of a portion of the first electrode layer around the magnetoresistive element.

2. The method according to claim 1, wherein, in the step of forming the layered structure, in the portion of the layered film located on the magnetoresistive element, the film to be the bias field applying layers is removed by dry etching, and the insulating film is removed by wet etching or dry etching.

3. The method according to claim 1, wherein, in the step of forming the layered film, the film to be the bias field applying layers is formed after the insulating film is formed.

4. The method according to claim 3, wherein, in the adjacent portions, the portions of the insulating layer are disposed between the respective portions of the bias field applying layers and the respective side surfaces of the magnetoresistive element.

5. The method according to claim 1, wherein, in the step of forming the layered film, the insulating film is formed after the film to be the bias field applying layers is formed.

6. The method according to claim 5, wherein, in the adjacent portions, the portions of the bias field applying layers are disposed between the respective portions of the insulating layer and the respective side surfaces of the magnetoresistive element.

7. The method according to claim 1, wherein:
the layered structure includes a first insulating layer and a second insulating layer that serve as the insulating layer;
the bias field applying layers are disposed between the first and second insulating layers;
the layered film includes a first insulating film to be the first insulating layer and a second insulating film to be the second insulating layer, the first and second insulating films serving as the insulating film; and
the first insulating film, the film to be the bias field applying layers and the second insulating film are formed in this order in the step of forming the layered film.

8. The method according to claim 7, wherein in the adjacent portions, portions of the first insulating layer are disposed between the respective portions of the bias field applying layers and the respective side surfaces of the magnetoresistive element, while portions of the second insulating layer are disposed between the respective portions of the bias field applying layers and the second electrode layer.

* * * * *

UNITED STATES PATENT AND TRADEMARK OFFICE
CERTIFICATE OF CORRECTION

| | | |
|---|---|---|
| PATENT NO. | : 7,408,746 B2 | Page 1 of 1 |
| APPLICATION NO. | : 11/167757 | |
| DATED | : August 5, 2008 | |
| INVENTOR(S) | : Junichi Sato | |

It is certified that error appears in the above-identified patent and that said Letters Patent is hereby corrected as shown below:

Please correct the application as follows:

IN THE SPECIFICATION:

Column 19, line 48, change "51R" to --51P.--.

Column 20, line 32, change "50C" to --5C--.

Signed and Sealed this

Twenty-first Day of October, 2008

JON W. DUDAS
*Director of the United States Patent and Trademark Office*